(12) United States Patent
Hiraoka

(10) Patent No.: US 11,299,641 B2
(45) Date of Patent: Apr. 12, 2022

(54) CURABLE LIQUID COMPOSITION, COMPOSITION-ACCOMMODATING CONTAINER, LIQUID COMPOSITION DISCHARGING DEVICE, CURED MATERIAL, AND METHOD OF MANUFACTURING CURED MATERIAL

(71) Applicant: RICOH COMPANY, LTD., Tokyo (JP)

(72) Inventor: Takao Hiraoka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/764,469

(22) PCT Filed: Dec. 20, 2018

(86) PCT No.: PCT/JP2018/047048
§ 371 (c)(1),
(2) Date: May 15, 2020

(87) PCT Pub. No.: WO2019/138837
PCT Pub. Date: Jul. 18, 2019

(65) Prior Publication Data
US 2020/0354593 A1 Nov. 12, 2020

(30) Foreign Application Priority Data

Jan. 10, 2018 (JP) .............................. JP2018-002114
Sep. 27, 2018 (JP) .............................. JP2018-182284

(51) Int. Cl.
*C08F 2/46* (2006.01)
*C08F 2/50* (2006.01)
*C08G 61/04* (2006.01)
*C09D 11/101* (2014.01)
*C08L 33/10* (2006.01)
*B33Y 70/00* (2020.01)

(52) U.S. Cl.
CPC ............ *C09D 11/101* (2013.01); *C08L 33/10* (2013.01); *B33Y 70/00* (2014.12)

(58) Field of Classification Search
CPC ....... C09D 11/30; C09D 11/101; B33Y 70/00; C08L 33/10
USPC ................. 522/65, 6, 189, 184, 71, 1; 520/1
See application file for complete search history.

(56) References Cited

U.S. PATENT DOCUMENTS

| | | | |
|---|---|---|---|
| 5,406,318 A | 4/1995 | Moore et al. | |
| 2010/0304149 A1 | 12/2010 | Loccufier et al. | |
| 2010/0313782 A1* | 12/2010 | Loccufier | B41M 1/04 101/483 |
| 2012/0178844 A1* | 7/2012 | Frey | G03F 7/031 522/8 |
| 2015/0232676 A1 | 8/2015 | Hiraoka | |
| 2015/0259554 A1 | 9/2015 | Hiraoka | |
| 2020/0010662 A1* | 1/2020 | Hiraoka | C09D 11/38 |

FOREIGN PATENT DOCUMENTS

| | | | |
|---|---|---|---|
| CN | 101835856 | 9/2008 | |
| CN | 104066758 | 9/2014 | |
| CN | 104144788 | 11/2014 | |
| CN | 104277591 * | 1/2015 | |
| CN | 103038296 B * | 4/2015 | ............ C09D 11/32 |
| CN | 106414513 * | 2/2017 | |
| CN | 107020805 | 8/2017 | |
| EP | 3 156 462 A1 | 4/2017 | |
| JP | 2004-526820 | 9/2004 | |
| JP | 2006-335988 * | 12/2006 | |
| JP | 2013-500303 | 1/2013 | |
| JP | 2014-070110 | 4/2014 | |
| JP | 2014-193968 * | 10/2014 | |
| WO | WO2002/061001 A1 | 8/2002 | |
| WO | WO2009/053348 A1 | 4/2009 | |
| WO | WO2011/012560 A1 | 2/2011 | |

OTHER PUBLICATIONS

Kunida etal, JP 2006-335988 Machine Translation, Dec. 14, 2006 (Year: 2006).*
Egusa et al, JP 2014-193968 Machine Translation, Oct. 9, 2014 (Year: 2014).*
Kouzuki etal, CN 104277591 Machine Translation, Jan. 14, 2015 (Year: 2015).*
Hiraoka, CN 106414513 Machine Translation, Feb. 15, 2017 (Year: 2017).*
Hoogmartens, CN 1036038296B Machine Translation, Apr. 8, 2015 (Year: 2015).*
International Search Report and Written Opinion dated Mar. 28, 2019 in PCT/JP2018/047048 filed on Dec. 20, 2018.
Chinese Office Action dated Dec. 2, 2021 in Chinese Application No. 201880083452.7, 10 pages.

* cited by examiner

*Primary Examiner* — Jessica Whiteley

(74) *Attorney, Agent, or Firm* — Grüneberg and Myers PLLC

(57) ABSTRACT

A curable liquid composition includes a monomer having an SI value of less than 3.0 and a photopolymerization initiator having a weight average molecular weight of 500 or greater, wherein the curable liquid composition is negative in skin sensitization.

18 Claims, 21 Drawing Sheets

CURABLE LIQUID COMPOSITION, COMPOSITION-ACCOMMODATING CONTAINER, LIQUID COMPOSITION DISCHARGING DEVICE, CURED MATERIAL, AND METHOD OF MANUFACTURING CURED MATERIAL

TECHNICAL FIELD

The present disclosure relates to a curable liquid composition, a composition-accommodating container, a liquid composition discharging device, a cured material, and a method of manufacturing the cured material.

BACKGROUND ART

Photopolymerizable compositions and inkjet ink containing acrylic acid ester compounds as the major component are widely known and most of the acrylic acid ester compounds involve skin sensitization problems such as skin swelling and itchy skin when such compounds touches skin (WO2002/061001). However, when polymerized by appropriate light irradiation, acrylic acid ester compounds have a higher molecular weight and causes less skin sensitization. Therefore, consumers who touch such polymerized acrylic acid ester compounds are little affected but those who handle the compositions and ink before irradiation (i.e., polymerization) have safety problems.

On the other hand, to improve skin sensitization, methacrylic acid ester compounds are known to be a substitute of acrylic acid ester compounds. However, methacrylic acid ester compounds produce peculiar smell immediately after polymerization, which is ascribable to a photopolymerization initiator used for polymerization. That is, this substitute clears the skin sensitization problem but creates a non-worker-friendly environment by the odor for workers who handle the compositions and ink before irradiation.

Therefore, as a measures to make consideration for the workers handling ink before light irradiation, photopolymerizable compositions and inkjet ink free of skin sensitization with sufficiently reduced odor, which is produced immediately after photopolymerization, are demanded to be available on the market.

Notably, there are methods using water or an organic solvent for photopolymerizable compositions and inkjet ink. However, such methods require heat sources to evaporate water and the organic solvent, which is not preferable in terms of energy saving. Therefore, photopolymerizable compositions and inkjet ink are preferably free of water and an organic solvent.

CITATION LIST

Patent Literature

[PTL 1] WO2004/526820

SUMMARY OF INVENTION

Technical Problem

The present disclosure is to provide a curable liquid composition free of the skin sensitization problem with sufficiently reduced peculiar order produced immediately after curing.

Solution to Problem

The problem mentioned above is solved by the following (1).

1. A curable liquid composition includes a monomer having an SI value of less than 3.0 and a photopolymerization initiator having a weight average molecular weight of 500 or greater, wherein the curable liquid composition is negative in skin sensitization.

Advantageous Effects of Invention

According to the present disclosure, provide is an improved curable liquid composition free of skin sensitization problems with sufficiently reduced peculiar order which is produced immediately after curing.

BRIEF DESCRIPTION OF DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF EMBODIMENTS

Figure 1:
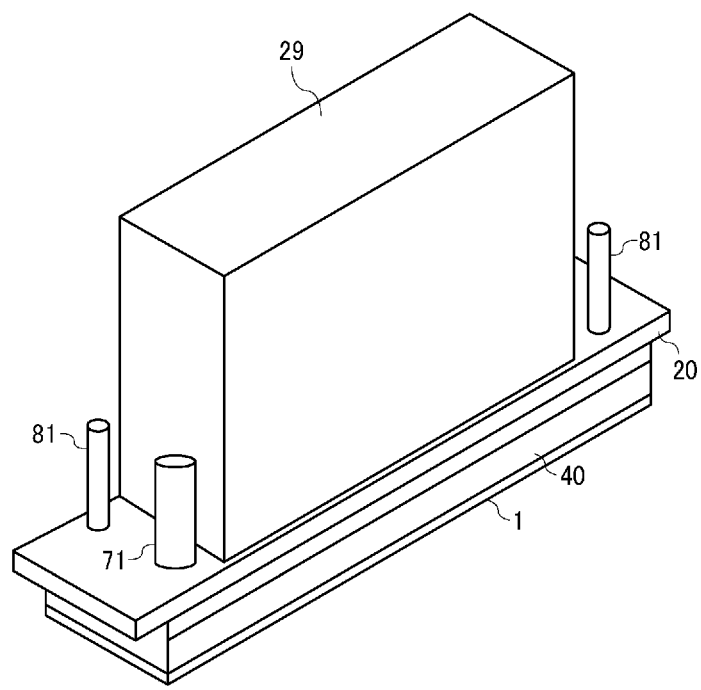
FIG. 1 is a diagram illustrating an exterior perspective view of an ink discharging head according to an embodiment of the present disclosure.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

The present disclosure will be described below in detail with reference to several embodiments and accompanying drawings.

A photopolymerizable inkjet ink having no problem with skin sensitization has been proposed (JP-2014-237804-A). However, in general, a photopolymerization initiator having a small molecular weight such as 1-hydroxy-cyclohexyl-phenyl-ketone (molecular weight of 204) is known to cause production of the following byproducts and these byproducts are thought to be a cause of a peculiar smell.

Chemical reaction formula 1

[Chem. 1]

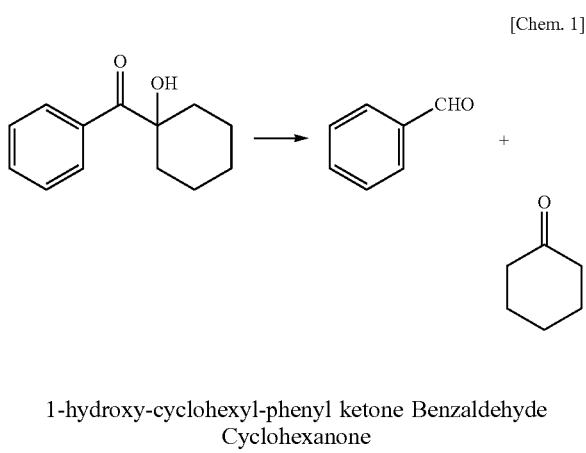

1-hydroxy-cyclohexyl-phenyl ketone Benzaldehyde Cyclohexanone

In the initial photopolymerization reaction, not only the target reaction but also side reaction proceed, which makes it difficult to completely prevent production of a by-product. However, it is possible to significantly reduce the peculiar odor produced immediately after the photopolymerization when a photopolymerization initiator having a weight average molecular weight of 500 or more is used because the by-product obtained in the initial photopolymerization reaction has a large molecular weight sufficiently to prevent easy evaporation. Due to this, a curable liquid composition can be provided making consideration of workers for skin sensitization and odor.

In the present disclosure, the liquid composition is liquid at room temperatures. Hereinafter, the curable liquid composition may be referred to as "curable composition" or "composition".

Since skin sensitization occurs as a substance passes through the skin, as the molecular weight decreases, skin sensitization worsens. That is, substances having a less molecular weight, i.e., lower viscosity, compound the skin sensitization problem. Further, due to the usage of a large molecular weight initiator, viscosity at the time of dissolution is increased. This makes it more challenging to lower the viscosity level of a curable composition to a suitable level for inkjet ink usage in terms of skin sensitization and odor, which can be solved by optimization of the formulation.

Skin sensitization of a composition is determined by skin sensitization of the raw material formulating the composition. According to the concept of Globally Harmonized System (GHS), which is the world standard, a substance or a mixture containing a skin sensitizing substance in an amount of 0.1 percent or more is defined as a skin sensitizing material. Therefore, formulating a composition with substances having negative skin sensitization results in negative in skin sensitization of the composition. Monomers having an SI value of less than 3.0 are negative in skin sensitization. SI values are measured by the method described in Examples described later.

The phenomenon of skin sensitization starts when a chemical substance passes through the barrier of skin. Therefore, a chemical substance having a smaller molecular weight tends to have a stronger skin sensitization. A composition constituted of chemical substances having smaller molecular weights, i.e., less viscous compositions do not easily come to be negative in skin sensitization. That is, as viscosity of a composition is lowered, demonstrating negative in skin sensitization becomes difficult. In particular, it is difficult to obtain negative in skin sensitization for a curable composition having a viscosity of 1000 mPa-s or less at 25 degrees C.

Monomer Having SI Value of Less than 3.0

In the present disclosure, monomers having an SI value of less than 3.0 are used as the component of a composition.

Examples of the monomers having an SI value of less than 3.0 and causing no skin sensitization problem are photopolymerizable monomers such as a (meth)acrylic acid ester compounds, which are inexpensively and easily available.

Specific examples include, but are not limited to, diethylene glycol dimethacrylate, polyethylene glycol dimethacrylate [$CH_2$=$C(CH_3)$—CO—($OC_2H_4$)$_n$—OCOC($CH_3$)=$CH_2$ (n is an average degree of polymerization, 2 or more in this case)], γ-butyrolactone methacrylate, trimethylolpropane trimethacrylate, ethylene oxide-modified trimethylolpropane trimethacrylate, propylene oxide-modified trimethylolpropane trimethacrylate, tricyclodecanedimethanol dimethacrylate, caprolactone-modified dipentaerythritol hexaacrylate, polypropylene glycol diacrylate [$CH_2$=CH—CO—($OC_3H_6$)$_n$-OCOCH=$CH_2$ (n is an average degree of polymerization, 12 or more in this case)], caprolactone-modified hydroxypivalic acid neopentyl glycol diacrylate, ethylene oxide-modified tetramethylolmethane tetraacrylate, ethylene oxide-modified bisphenol A diacrylate, neopentyl glycol dimethacrylate, stearyl acrylate, isostearyl acrylate, 1,4-butanediol dimethacrylate, hydroxyethyl acrylamide, glycerol dimethacrylate, and glycerol monomethacrylate.

The monomer preferably includes a hydroxyl group-containing monomer.

Glycerol dimethacrylate and glycerol monomethacrylate include hydroxyl groups, which enhances cohesion to inorganic substrates, in particular, glass.

Moreover, optionally, the following material compounds causing some skin trouble if used alone and (meth)acrylate, (meth)acrylamide, and vinyl compounds whose skin sensitization is not evaluated can be used in combination. These monomers are used in such an amount that skin sensitization of a composition containing these is negative.

Specific examples include, but are not limited to, ethylene glycol di(meth)acrylate, hydroxy pivalic acid neopentyl glycol di(meth)acrylate, γ-butylolactone acrylate, formalized trimethylol propane mono(meth)acrylate, polytetramethylene glycol di(meth)acrylate, trimethylol propane (meth)acrylic acid salicylic acid ester, diethylene glycol diacrylate, triethylene glycol diacrylate, tetraethylene glycol diacrylate, polyethylene glycol diacrylate [(CH$_2$=CH—CO—(OC$_2$H$_4$)n-OCOCH=CH$_2$ (n≈9)], polyethylene glycol di(meth)acrylate [(CH$_2$=CH—CO—(OC$_2$H$_4$)n-OCOCH=CH$_2$ (n≈14)], polyethylene glycol di(meth)acrylate [(CH$_2$=CH—CO—(OC$_2$H$_4$)n-OCOCH=CH$_2$ (n≈23)], dipropylene glycol di(meth)acrylate, tripropylene glycol di(meth)acrylate, polypropylene glycol dimethacrylate [(CH$_2$=C(CH$_3$)—CO—(OC$_3$H$_6$)n-OCOC(CH$_3$)=CH$_2$ (n≈7)], 1,3-butane diol diacrylate, 1,4-butane diol di(meth) acrylate, 1,6-hexane diol di(meth)acrylate, 1,9-nonane diol di(meth)acrylate, neopentyl glycol di(meth)acrylate, propylene oxide-modified bisphenol A di(meth)acrylate, polyethylene glycol di(meth)acrylate, dipenta erythritol hexa(meth) acrylate, (meth)acryloyl morphorine, 2-hydroxypropyl (meth)acryl amide, propylene oxide-modified tetramethylol methane tetra(meth)acrylate, dipentaerythritol hydroxypenta(meth)acrylate, caprolactone-modified dipentaerythritol hydroxy penta(meth)acrylate, ditrimethylol propane tetra (meth)acrylate, pentaerythritol tetra(meth)acrylate, trimethylol propane triacrylate, ethylene oxide-modified trimethylol propane triacrylate, propylene oxide-modified trimethylol propane tri(meth)acrylate, caprolactone-modified trimethylol propane tri(meth)acrylate, pentaetythritol tri(meth)acrylate, tris(2-hydroxyethyl)isocyanulate tri (meth)acrylate, ethoxylated neopentyl glycol di(meth)acrylate, propylene oxide-modified neopentyl glycol di(meth) acrylate, propylene oxide-modified glyceryl tri(meth) acrylate, polyester di(meth)acrylate, polyester tri(meth) acrylate, polyester tetra(meth)acrylate, polyeter penta(meth) acrylate, polyester poly(meth)acrylate, (meth)acryloyl morpholine hydroxy ethyl(meth)actylamide, N-vinylcaprolactam, N-vinyl pyrrolidone, N-vinyl formamide, polyurethane di(meth)acrylate, polyurethanetri(meth)acrylate, polyurethane tetra(meth)acrylate, polyurethane penta(meth) acrylate, polyurethane poly(meth)acrylate, triethylene glycol divinylether, cyclohexane dimethanol divinylether, cyclohexane dimethanol monovinylether, hydroxyethyl vinylether, diethylene glycol monovinylether, diethylene glycol divinylether, dicyclopenta dienevinylether, tricyclodecane vinylether, benzylvinylether, ethyloxethane methylvinylether, triethylene glycol divinylether, hydroxybutylvinylether, and ethylvinylether.

Photopolymerization Initiator

In the present disclosure, a photopolymerization initiator having a weight average molecular weight of 500 or more is used as a composition component.

It is preferable to use a photoradical polymerization initiator as the photopolymerization initiator. It is preferable to use an article negative in skin sensitization as the photoradical polymerization initiator. When skin sensitization of the photopolymerization initiator is not negative, the photopolymerization initiator is used in a concentration range in which skin sensitization of the curable composition is negative. However, if the molecular weight of the photopolymerization initiator is too large, spinnability peculiar to a polymer solution as liquid is demonstrated, although skin sensitization is good. In particular, when used for inkjet, discharged liquid does not travel right way or is elongated, which leads to image disturbance. Taking this into account, the weight average molecular weight of the photopolymerization initiator is preferably 10,000 or less.

(Meth)acrylic acid ester, (meth)acryl amide and derivatives thereof, and vinylether compounds are known to have an ionic polymerizability as well. However, ionic polymerization initiators are generally expensive and produce a slight amount of strong acid or alkali without irradiation with light. Therefore, it is suitable to take special cares of, for example, imparting acid resistance and alkali resistance to composition supply paths in a liquid discharging system. Therefore, latitude of selection of members constituting a liquid discharging system is restricted. In contrast, a photoradical polymerization initiator which is inexpensive and generates no strong acid or strong alkali can be used for the composition of the present disclosure. Therefore, manufacturing a composition at low cost is possible and choosing members for the liquid discharging system is easy. When using a high energy light source such as electron beams, α ray, β ray, γ ray, or X ray, polymerization reaction proceeds without a polymerization initiator. This is generally known and the facility is extremely expensive so that such an application is not described in detail in the present disclosure.

The amount of the photopolymerization initiator in a composition is preferably small in terms of cost. To cure with a smaller amount of light, it is possible to further add the photopolymerization initiator, which is a radical producing source. However, as the amount of the photopolymerization initiator is increased, viscosity of the composition is increased or the cost is increased, so that it can be appropriately determined in a range where the composition does not have high viscosity.

Also, in terms that a photopolymerization initiator does not easily evaporate, the molecular weight thereof is preferably large. However, if a photopolymerization initiator having a large molecular weight is added to a composition, the photopolymerization initiator increases viscosity of the composition. Therefore, the weight average molecular weight of a photopolymerization initiator is more preferably 2000 or less.

The photopolymerization initiator is preferably a liquid polymer. Such a liquid monomer can be evenly dispersed in the composition.

As the photopolymerization initiator, a photopolymerization initiator having a chemical structure including a phenylglyoxylate skeleton, a photopolymerization initiator having a chemical structure including a benzophenone skeleton, or a photopolymerization initiator having a chemical structure including a nitrogen atom is preferably used.

A photopolymerization initiator having a chemical structure including a phenylglyoxylate skeleton and a photopolymerization initiator having a chemical structure including a benzophenone skeleton initiate polymerization initiate polymerization with short wavelength light. Also, since it does not involve coloration, it is suitable for a clear composition containing no coloring material.

In addition, a photopolymerization initiator having a chemical structure containing a nitrogen atom initiates polymerization with long wavelength light and causes some coloration, so it is suitable for a composition containing a coloring material.

The photopolymerization initiator may be, for example, a polymer represented by the following structural formula and having a weight average molecular weight of 500 or more.

C1: Polybutylene glycol-bis-phenylglyoxylate

Chemical Formula 2

[Chem. 2]

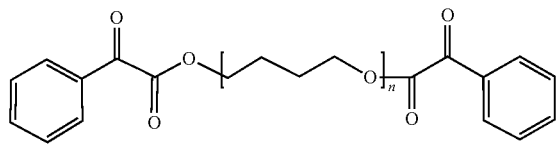

C2: Diester of polytetramethylene glycol and carboxymethoxybenzophenone
Chemical Formula 3
[Chem. 3]
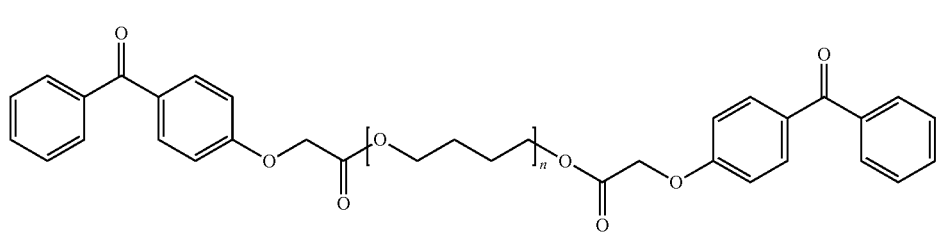
C3: Diester of polyethylene glycol and carboxybenzophenone
Chemical Formula 4
[Chem. 4]
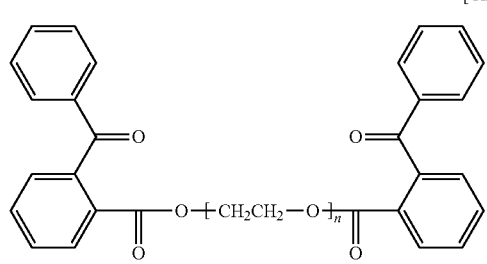
C4: Polyethylene glycol-bis-dimethylaminobenzoate
Chemical Formula 5
[Chem. 5]
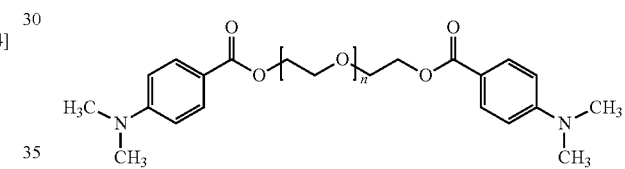
C5: Diester of Polytetramethylene Glycol and Carboxymethoxy Thioxanthone
Chemical Formula 6
[Chem. 6]
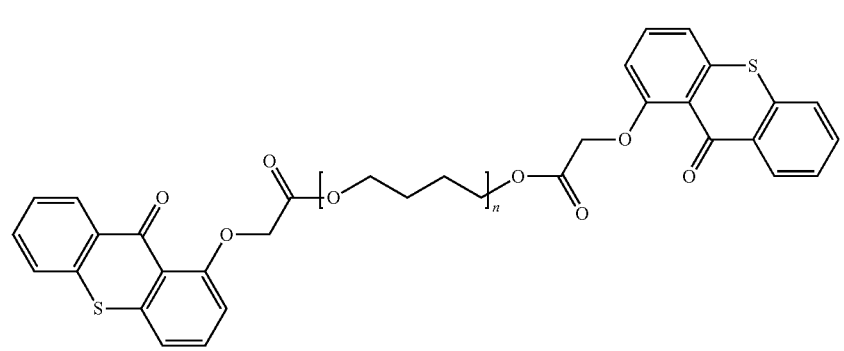

C6: Polyethylene glycol-di-(β-4[4-(2-dimethyl-amino-2-benzyl)butanoylphenyl]piperazine) propionate Chemical Structure 7

Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97,

[Chem. 7]

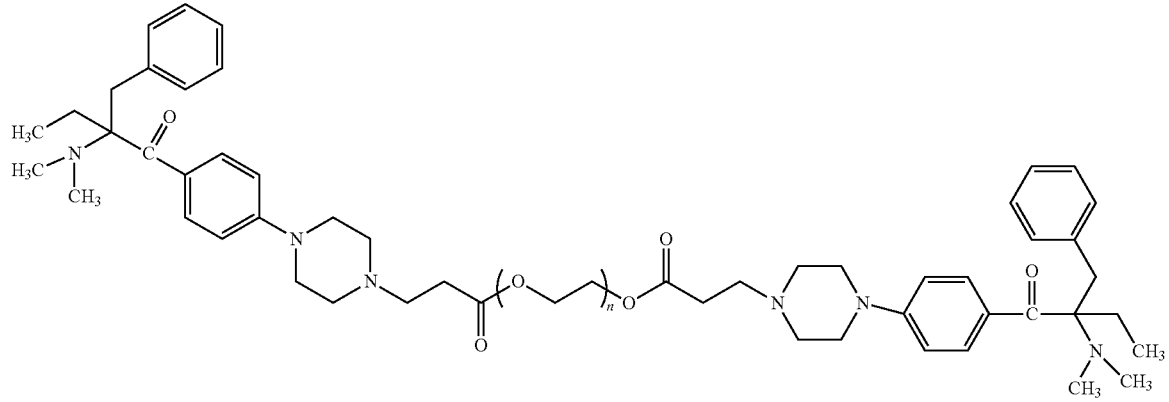

As described above, in terms of not only weak odor but also good curability and good adhesion to a glass substrate, a photopolymerization initiator having a molecular weight of 500 or more preferably accounts for 10 to 31 parts by mass of 100 parts by mass of the total amount of the monomer components. When a coloring material is contained, it is preferable to contain a photopolymerization initiator containing a nitrogen atom having a molecular weight of 500 or more in an amount of from 3 to 30 parts by mass based on 100 parts by mass of the total amount of the monomer components. Within this range, color tone is not adversely affected.

Further, it is preferable to add a photopolymerization initiator having a molecular weight of 500 or more in a large amount in order to obtain sufficient curability. However, to prevent an increase of viscosity of the liquid, the photopolymerization initiator having a molecular weight of 500 or more is desirably 30 parts by mass or less based on 100 parts by mass of the total amount of the monomer component.

In addition, a photopolymerization initiator having a molecular weight of less than 500 can be used in combination as long as the combination does not adversely affect the odor problem. The amount of the photopolymerization initiator is desirably 5 parts by mass or less based on 100 parts by mass of the total amount of the monomer.

Also, it is preferable to add a monomer having an SI value of less than 3.0 in an amount of 50 to 95 parts by mass based on 100 parts by mass of the total amount of the liquid composition.

Coloring Material

The composition may be a clear composition without a coloring material or a colored composition by containing a coloring material. It is preferable to use an article with less color for materials other than the coloring materials mentioned above or below to obtain a clear composition desired to be transparent and clear or a composition keeping the color tone of the coloring material.

To cause a composition to contain a coloring material, known inorganic pigments and organic pigments can be used as the coloring material of the composition.

Carbon black manufactured by a furnace method or a channel method can be used as black pigment.

Pigment Yellow-based pigments can be used as yellow pigments. Specific examples include, but are not limited to, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Pigment Red-based pigments can be used as magenta pigments.

Specific examples include, but are not limited to, Pigment Red 5, Pigment Red 7, Pigment Red 12, Pigment Red 48 (Ca), Pigment Red 48 (Mn), Pigment Red 57 (Ca), Pigment Red 57:1, Pigment Red 112, Pigment Red 122, Pigment Red 123, Pigment Red 168, Pigment Red 184, Pigment Red 202, and Pigment Violet 19.

Pigment Blue-based pigments can be used as cyan pigments.

Specific examples include, but are not limited to, Pigment Blue 1, Pigment Blue 2, Pigment Blue 3, Pigment Blue 15, Pigment Blue 15:3, Pigment Blue 15:4. Pigment Blue 16, Pigment Blue 22, Pigment Blue 60, Pat Blue 4, and Pat Blue 60.

Specific examples of white pigments or colorless fillers to reform physical properties include, but are not limited to, sulfates of alkaline earth metals such as barium sulfide, carbonates of alkaline earth metals such as calcium carbonates, silicas such as fine powder of silicic acid and synthetic silicate, calcium silicate, alumina, hydrated alumina, titanium oxide, zinc oxide, talc, and clay.

Considering properties, other inorganic pigments and organic pigments can be optionally used.

Further, it is possible to optionally add polymerization inhibitors such as 4-methoxy-1-naphthol, methylhydroquinone, hydroquinone, t-butylhydroquinone, dit-butylhydroquinone, methoquinone, 2,2'-dihydroxy-3,3'-di(α-methylcyclohexyl)-5,5'-dimethyl diphenylmethane, pbenzoquinone, di-t-butyldiphenylamine, 9,10-di-n-butoxyanthracene, and 4,4'-[1,10-dioxo-1,10-decandylbis (oxy)] bis [2,2,6,6-tetramethyl]-1-piperidinyloxy, surfactants such as higher aliphatic acid esters having polyether, an amino group, a carboxyl group, or a hydroxyl group, polydimethylsiloxane compounds having polyether, an amino group, a carboxyl group, or a hydroxyl group at the side chain or the distal end, and fluoroalkyl compounds having polyether, an amino group, a carboxyl group, or a hydroxyl group, and polar group-containing polymeric pigment dispersants.

The application field of the curable composition of the present disclosure is not particularly limited. It can be applied to any field where the active energy ray curable composition is used. For example, the curable composition is selected to a particular application and used for a resin for molding, a paint, an adhesive, an insulant, a release agent, a coating material, a sealing material, various resists, and various optical materials.

Furthermore, the curable composition of the present disclosure can be used as an ink to form two-dimensional texts, images, and designed coated film on various substrates and in addition a solid object forming material to form a three-dimensional image (solid freeform fabrication object).

An apparatus for fabricating a three-dimensional (solid) object by the curable liquid composition of the present disclosure can be a known apparatus and is not particularly limited. For example, the apparatus includes a containing device, a supplying device, and a discharging device of the curable composition, an active energy ray irradiator, etc.

In addition, the present disclosure includes cured matter obtained by causing the curable liquid composition to cure and processed products obtained by processing structures having the cured matter formed on a substrate. For example, cured matter or structures having a sheet-like form or film-like form is subject to molding process such as hot drawing and punching to obtain such processed products. The molded product is preferably used for, for example, gauges or operation panels of vehicles, office machines, electric and electronic machines, and cameras, which require surface-processing after decorating the surface.

Composition-Accommodating Container

The composition-accommodating container of the present disclosure means a container accommodating the curable composition and is suitable for the applications as described above. For example, if the curable composition of the present disclosure is used for ink, a container that accommodates the ink can be used as an ink cartridge or an ink bottle. Therefore, users can avoid direct contact with the ink during working such as transfer or replacement of the ink, so that fingers and clothes are prevented from being contaminated. Furthermore, inclusion of foreign matter such as dust in the ink can be prevented. In addition, the container can be of any size, any form, and any material. For example, the container can be designed to a particular application. It is preferable that the container be made of a light blocking material to block the light or covered with a light blocking sheet, etc. For example, the composition-accommodating container preferably includes an ink bag formed of an aluminum laminate film, a resin film, etc.

Figure 13:
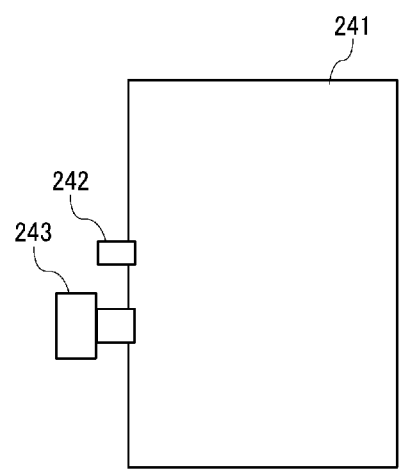
FIG. 13 is a schematic diagram illustrating an example of the ink bag of an ink cartridge.
Figure 14:
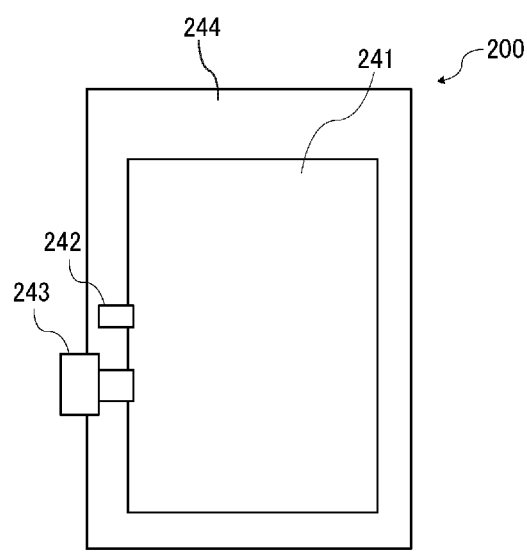
FIG. 14 is a schematic diagram illustrating an example of the ink cartridge in which an ink bag is accommodated.

Next, the ink cartridge is described in detail with reference to FIGS. 13 and 14. FIG. 13 is a schematic diagram illustrating an example of an ink bag 241 of an ink cartridge. FIG. 14 is a schematic diagram illustrating an ink cartridge 200 accommodating the ink bag 241 of FIG. 13 in a cartridge housing 244.

As illustrated in FIG. 13, after the ink bag 241 is filled with the ink through an ink inlet 242 and the air remaining in the ink bag 241 is discharged, the ink inlet 242 is closed by fusion. When in use, an ink outlet 243 made of a rubber member is pierced by the needle installed onto an inkjet recording device to supply the ink into the device.

The ink bag 241 is formed of a packaging material such as aluminum laminate film having no air permeability. The ink bag 241 is normally accommodated in a cartridge housing 244 made of plastic as illustrated in FIG. 14 to form the ink cartridge 200, which is detachably attachable to various liquid discharging devices.

The composition-accommodating container of the present disclosure is preferably detachably attachable to a liquid discharge device. This makes it possible to simplify replenishment and replacement of a composition, thereby improving the workability.

Liquid Composition Discharging Device

Figure 15:
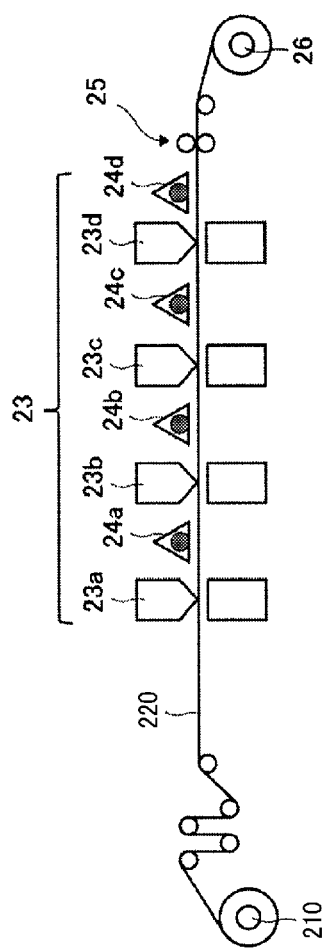
FIG. 15 is a schematic diagram illustrating an example of a liquid composition discharging device. The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 15 is a schematic diagram illustrating an example of a liquid discharging device (printing device) using the composition as ink.

FIG. 15 is a diagram illustrating an example of a configuration of color image forming including discharging each color ink of, for example, yellow, magenta, cyan, and black by a printing unit 23 (23a, 23b, 23c and 23d for each color of yellow, magenta, cyan, and black, respectively) to a print substrate (recording medium) 220 supplied and conveyed from left to right on the drawing by a print substrate supplying roll 210 and irradiating each print of yellow, magenta, cyan, and black with ultraviolet light emitted by ultraviolet ray light sources (light source for curing) 24a, 24b, 24c, and 24d, respectively, to cause each print to cure.

The print substrate 220 can be made of plastic, metal, etc. Of all, polypropylene and polyethylene terephthalate are most suitable for the ink of the present disclosure. In FIG. 15, the print substrate 220 takes a roll form but also may have a sheet-like form or an appropriate form in accordance with applications. Also, duplex printing is possible as well as simplex printing.

For high performance printing, color print is irradiated with ultraviolet rays every time each color is printed to enhance curability. Also, for example, it is possible to have a configuration in which the ultraviolet ray light source 24d emits a sufficient amount of ultraviolet rays to cause multiple color prints to cure once after multiple colors are printed while weakening or omitting the power of the ultraviolet ray light sources 24a, 24b, and 24c. Alternatively, LED light sources which have been introduced for photopolymerizable ink printing can be used instead of typically-used light sources such as high-pressure mercury lamps and metal halide lamps to save energy and reduce cost. This configuration illustrated in FIG. 15 includes a processing unit 25 and a print reeling roll 26. The printing unit 23 also accommodates ink or an ink cartridge so that the ink can be stably supplied during printing.

The discharging head preferably includes multiple nozzles to discharge liquid, individual liquid chambers communicating with the multiple nozzles, a common liquid chamber to supply the liquid to the individual liquid chambers, a circulating flow channel communicating with the individual liquid chambers, a common circulating liquid chamber communicating with the circulating flow channel, and a pressure generator to apply a pressure to the liquid in the individual liquid chambers.

When the curable liquid composition of the present disclosure is used as ink, it is preferable to use a flow-through type in which the ink circulates in the individual liquid chamber of the discharging head. The ink can be circulated during operation and non-operation of the ink discharging head. Due to this ink circulation during downtime, the ink in the individual liquid chamber is always refreshed. Also, agglomeration and settling-down of the components contained in the ink can be reduced, which is preferable.

A photopolymerization initiator having a molecular weight of 500 or more tends to have a polyalkylene glycol structure. Therefore, inclusion of this increases hydrophilicity of the composition. When the mechanism for circulating and maintaining the ink in the head is provided, for example, if the inkjet head is left exposed for a long time in a high temperature and high humidity environment, the ink around the nozzle surface contains a large amount of moisture, so that the stable dispersion state does not collapse and a stable discharge state can be obtained immediately after leaving still.

When the composition of the present disclosure is used as white ink, titanium oxide particles, which are used as a pigment, have a high specific gravity, thereby tending to settle out. Therefore, when the liquid is still, nozzle clogging easily occurs. However, the flow-through type head can prevent such nozzle clogging. In particular, maintenance work can be simplified when resuming discharging.

A liquid discharging device having a flow-through type discharging head will be described with reference to FIGS. 1 to 12.

Figure 2:
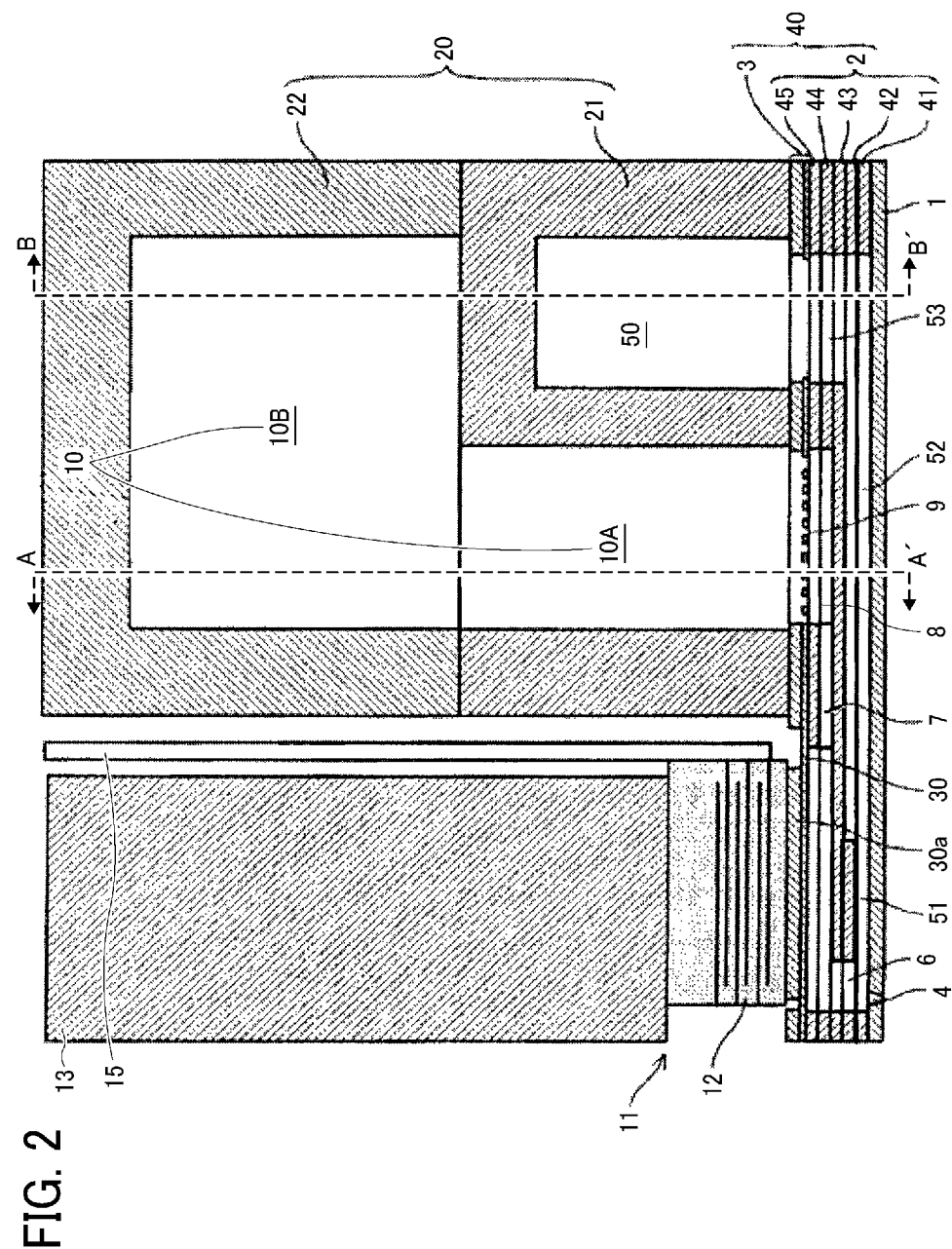
FIG. 2 is a diagram illustrating a cross section of the ink discharging head illustrated in FIG. 1 in a direction orthogonal to the nozzle arrangement direction thereof.
Figure 3:
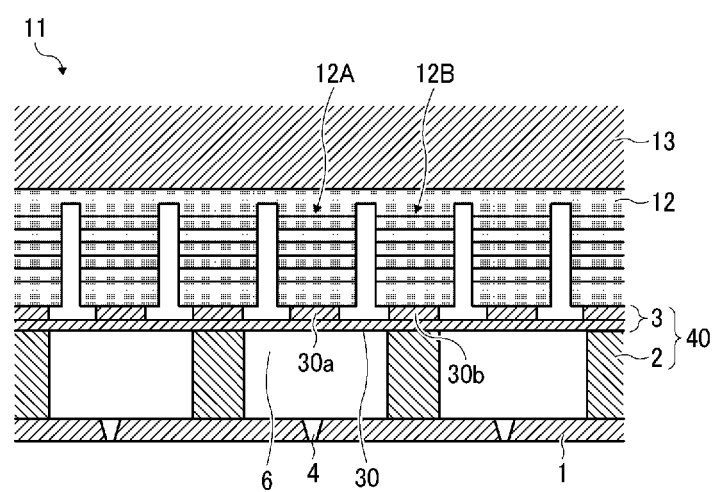
FIG. 3 is a diagram illustrating a partial cross section of the ink discharging head illustrated in FIG. 1 in a direction parallel to the nozzle arrangement direction thereof.
Figure 4:
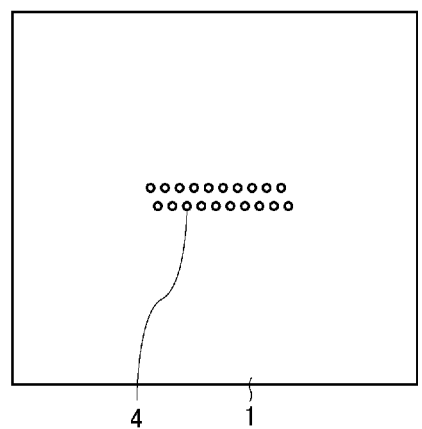
FIG. 4 is a diagram illustrating a planar view of the nozzle plate of the ink discharging head illustrated in FIG. 1.
Figure 8:
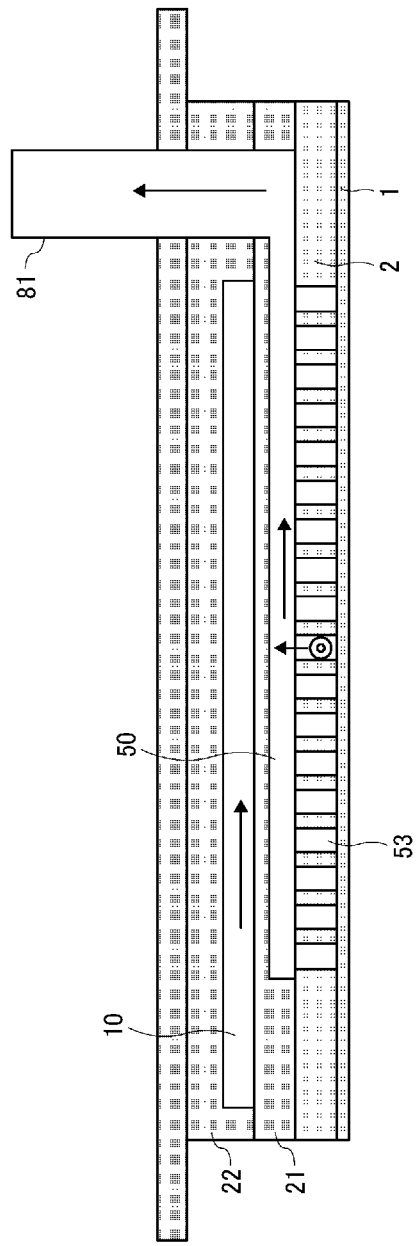
FIG. 8 is a diagram illustrating a cross-section of FIG. 2 on line A-A'.
Figure 9:
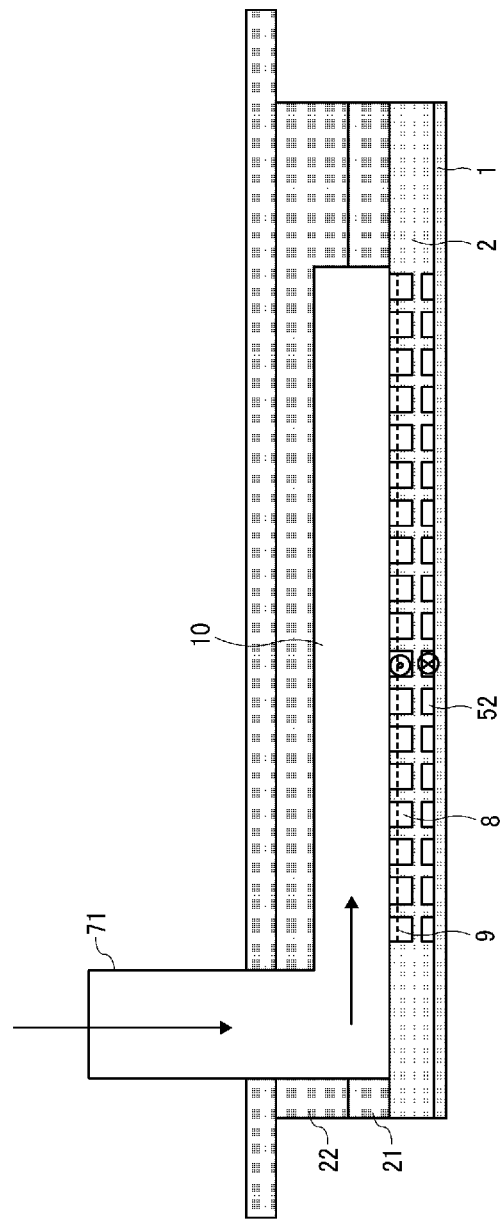
FIG. 9 is a diagram illustrating a cross-section of FIG. 2 on line B-B'.

Embodiments of the present disclosure are described with reference to the accompanying drawings. Next, an example of the liquid discharging head relating to embodiments of the present disclosure is described with reference to FIG. 1 to FIG. 6. FIG. 1 is a diagram illustrating an exterior perspective view of the liquid discharging head, FIG. 2 is a diagram illustrating a cross-section of the head in the direction perpendicular to the nozzle arrangement direction, FIG. 3 is a diagram illustrating a cross-section of the head in a direction parallel to the nozzle arrangement direction, FIG. 4 is a diagram illustrating a planar view of the nozzle plate of the head, FIG. 5 is a diagram illustrating a planar view of each member constituting the flow channel member of the head, and FIG. 6 is a diagram illustrating a planar view of each member constituting the common liquid chamber member of the head. FIG. 8 is a diagram illustrating a cross-section taken along the line AA' of FIG. 2, and FIG. 9 is a diagram illustrating a cross-section taken along the line BB' of FIG. 2.

In the liquid discharging head, a nozzle plate 1, a flow channel plate 2, and a diaphragm member 3 as wall member are laminated and jointed to each other. Also, the ink discharging head includes a piezoelectric actuator 11 to displace the diaphragm member 3, a common liquid chamber member 20, and a cover 29.

The nozzle plate 1 includes multiple nozzles 4 to discharge liquid.

The flow channel plate 2 forms an individual liquid chamber 6 communicating with a nozzle 4, a liquid resistance 7 communicating with the individual liquid chamber 6, and a liquid introducing portion 8 communicating with the liquid resistance 7. In addition, the flow channel plate 2 is formed of a plurality of plate-like members 41 to 45 laminated and jointed to each other from the side of the nozzle plate 1. These plate-like members 41 to 45 and the diaphragm member 3 are laminated and attached to each other to form a flow channel member 40.

The diaphragm member 3 includes a filter portion 9 as an orifice causing the liquid introducing portion 8 to communicate with a common liquid chamber 10 formed of the common liquid chamber member 20.

The diaphragm member 3 is a wall surface member forming the wall surface of the individual liquid chamber 6 of the flow channel plate 2. This diaphragm member 3 has a double layer structure (but not limited thereto) formed of a first layer forming a thin portion and a second layer forming a thick portion from the side of flow channel plate 2. The first layer forms a transformable vibration area 30 at the site corresponding to the individual liquid chamber 6.

Figure 5A:
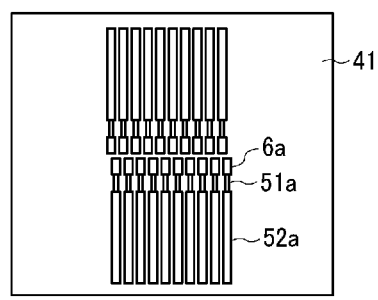
FIGS. 5A to 5F are diagrams illustrating planar views of each member constituting a flow channel member of the ink discharging head illustrated in FIG. 1.

The nozzle plate 1 includes multiple nozzles 4 in a zigzag manner as illustrated in FIG. 4. On the plate-like member 41 forming the flow channel plate 2, a through-hole groove portion (i.e., a through hole having a groove-like form) 6a constituting the individual liquid chamber 6, and through hole groove portions 51a and 52a constituting the liquid resistance 51 and the circulation flow channel 52 are formed as illustrated in FIG. 5A.

Figure 5B:
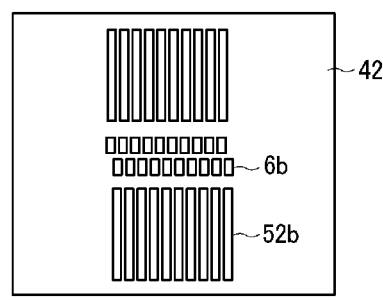

Similarly, on the plate-like member 42, a through-hole groove portion 6b constituting the individual liquid chamber 6 and a through-hole groove portion 52b constituting the circulation flow channel 52 are formed as illustrated in FIG. 5B.

Figure 5C:
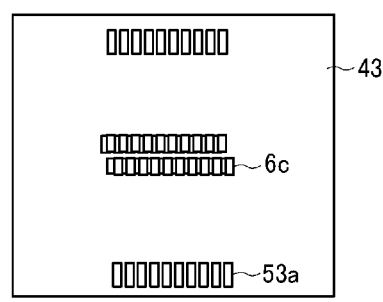
Figure 5D:
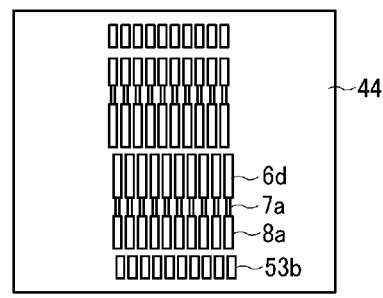
Figure 5E:
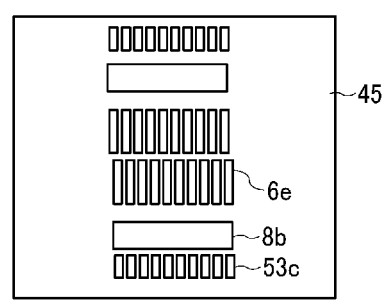
Figure 5F:
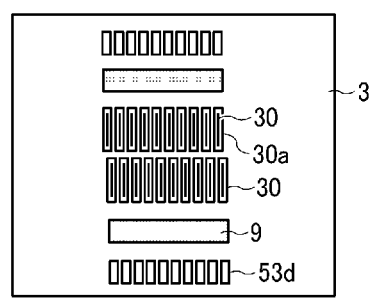

Similarly, on the plate-like member 43, a through-hole groove portion 6c constituting the individual liquid chamber 6 and a through-hole groove portion 53a constituting a circulation flow channel 53 with the nozzle disposition direction along the longitudinal direction are formed as illustrated in FIG. 5C. Similarly, on the plate-like member 44, a through-hole groove portion 6d constituting the individual liquid chamber 6, a through-hole groove portion 7a constituting the fluid resistance 7, a through-hole groove portion 8a constituting the liquid introducing portion 8, and a through-hole groove portion 53b constituting the circulation flow channel 53 with the nozzle disposition direction along the longitudinal direction are formed as illustrated in FIG. 5D. Similarly, on the plate-like member 45, a through-hole groove portion 6e constituting the individual liquid chamber 6, a through-hole portion 8b (forming a liquid chamber on the downstream of the filter) constituting the liquid introducing portion 8 with the nozzle disposition direction along the longitudinal direction, and a through-hole groove portion 53c constituting a circulation flow channel 53 with the nozzle disposition direction along the longitudinal direction are formed as illustrated in FIG. 5E. Similarly, on the plate like member 3, the vibration area 30, the filter portion 9, and a through-hole groove portion 53d constituting the circulation flow channel 53 with the nozzle disposition direction along the longitudinal direction are formed as illustrated in FIG. 5F.

Such a simple configuration having the flow channel member constituted of laminated and jointed multiple plate-like members can form complicated flow channels.

According to this configuration, on the flow channel member 40 formed of the flow channel plate 2 and the diaphragm member 3, the fluid resistance 51 along the surface direction of the flow channel plate 2 communicating with each of the individual liquid chambers 6, the circulation flow channel 52, and the circulation flow channel 53 disposed along the thickness direction of the flow channel member 40 communicating with the circulation flow channel 52 are formed. The circulation flow channel 53 communicates with a circulation common liquid chamber 50, which is described later.

The common liquid chamber member 20 includes the common liquid chamber 10 and the circulation common liquid chamber 50 to which the liquid is supplied from a supply and circulation assembly 494.

Figure 6A:
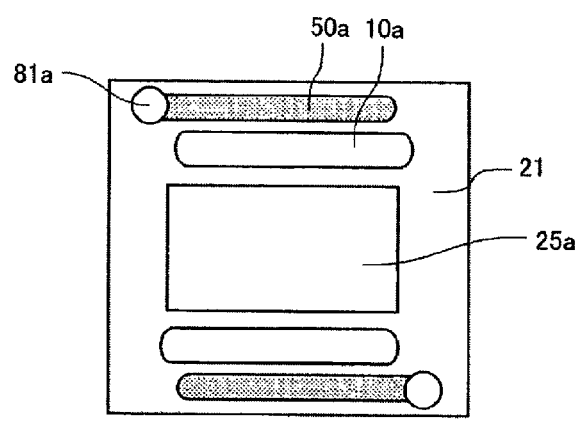
FIGS. 6A and 6B are diagrams illustrating planar views of each member constituting a common liquid chamber member of the ink discharging head illustrated in FIG. 1.

As illustrated in FIG. 6A, on a first common liquid chamber member 21 constituting the common liquid chamber member 20, there are formed a through-hole 25a for piezoelectric actuator, a through-hole groove portion 10a constituting a common liquid chamber 10A on the downstream side, and a groove portion 50a with a basement, which constitutes the circulation common liquid chamber 50.

Figure 6B:
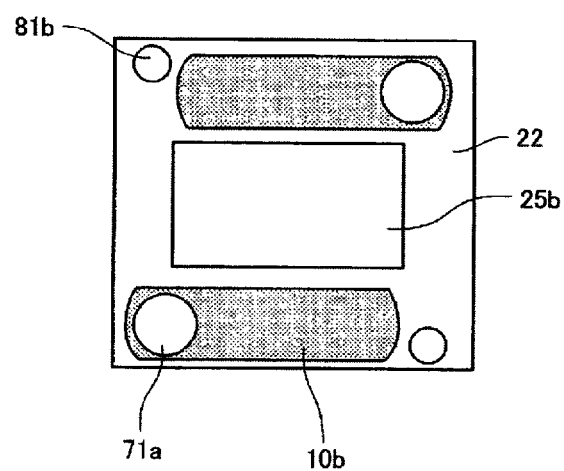

As illustrated in FIG. 6B, on a second common liquid chamber member 22, there are formed a through hole 25b for piezoelectric actuator and a groove portion 10b constituting a common liquid chamber 10B on the upstream side. In addition, as illustrated in FIG. 1, on the second common liquid chamber 22, there are formed a through-hole 71a as a supplying opening communicating one end of the common liquid chamber 10 in the nozzle arrangement direction with a supply port 71.

On the first common liquid chamber member 21 and the second common liquid chamber member 22, there are formed through-holes 81a and 81b communicating the other end (the end on the opposite side of the through-hole 71a) of the circulation common liquid chamber 50 in the nozzle arrangement direction with a circulation port 81.

Note that, in FIGS. 6A and 6B, the groove portion having a base is illustrated in solid (this applies to the drawings below).

The common liquid chamber member 20 is constituted of the first common liquid chamber member 21 and the second common liquid chamber member 22. The first common liquid chamber member 21 is jointed to the flow channel member 40 on the side of the diaphragm member 3 and the second common liquid chamber member 22 is laminated and jointed to the first common liquid chamber member 21.

The first common liquid chamber member 21 forms a common liquid chamber 10A on the downstream side, which partially constitutes the common liquid chamber 10 communicating with the liquid introducing portion 8 and the circulation common liquid chamber 50 communicating with the circulation flow channel 53. In addition, the second common liquid chamber member 22 forms the common liquid chamber 10B on the upstream side, which constitutes the rest of the common liquid chamber 10.

The common liquid chamber 10A on the downstream side partially forming the common liquid chamber 10 and the circulation common liquid chamber 50 are disposed side by side in the direction orthogonal to the nozzle arrangement direction. Also, the circulation common liquid chamber 50 is disposed at the position projected in the common liquid chamber 10.

Due to this, the dimension of the circulation common liquid chamber 50 obtains freedom of designing from the dimension required for the flow channels including the individual liquid chamber 6, the fluid resistance 7, and the liquid introducing portion 8 formed of the flow channel member 40.

Moreover, since the circulation common liquid chamber 50 is disposed side by side with a part of the common liquid chamber 10 and the circulation common liquid chamber 50 is positioned in the projection thereof in the common liquid chamber 10, the width of the head along the direction orthogonal to the nozzle arrangement direction can be reduced, thereby preventing a size increase of the head. The common liquid chamber member 20 includes the circulation common liquid chamber 50 and the common liquid chamber 10 to which the liquid is supplied from a head tank or a liquid cartridge.

On the opposite side of the diaphragm member 3 relative to the individual liquid chamber 6 is arranged the piezoelectric actuator 11 including an electromechanical transducer element as a drive device to transform the vibration area 30 of the diaphragm member 3.

As illustrated in FIG. 3, this piezoelectric actuator 11 includes a piezoelectric member 12 jointed onto a base member 13. The piezoelectric member 12 is grooved by half cut dicing and a particular number of piezoelectric elements 12A and 12B having a columnar form are formed on the single piezoelectric member 12 in a pectinate manner spaced a predetermined distance therebetween.

Although the piezoelectric element 12A of the piezoelectric element 12 is used as a piezoelectric element driven by a drive waveform and the piezoelectric element 12B of the piezoelectric element 12 is used as a simple supporting column without an application of a drive waveform, all of the piezoelectric elements 12A and the piezoelectric elements 12B can be used as piezoelectric elements driven by drive waveforms.

The piezoelectric element 12A is jointed to a convex portion 30a, which is a thick part having an island-like form formed on the vibration area 30 of the diaphragm member 3. The piezoelectric element 12B is jointed onto a convex portion 30b, which is a thick part of the diaphragm member 3.

This piezoelectric member 12 has a structure in which piezoelectric layers and internal electrodes are alternately laminated, and it has been confirmed that in the present disclosure, it is possible to obtain a stable discharging state with a piezoelectric member having a film thickness of 3 μm or less. Each of the inner electrodes is pulled out to the exterior to form outer electrodes, to which flexible wiring members 15 are connected.

In the liquid discharging head having such a configuration, for example, the piezoelectric element 12A shrinks when the voltage applied to the piezoelectric element 12A is lowered from a reference voltage. For this reason, the vibration area 30 of the diaphragm member 3 is lowered, thereby inflating the volume of the individual liquid chamber 6, so that the liquid flows into the individual liquid chamber 6.

Thereafter, the voltage applied to the piezoelectric element 12A is raised to elongate the piezoelectric element 12A in the lamination direction, thereby transforming the vibration area 30 of the diaphragm member 3 in the direction of the nozzle 4. As a result, the volume of the individual liquid chamber 6 is reduced so that the liquid in the individual liquid chamber 6 is pressurized and discharged from the nozzle 4. As a result, due to the surface tension, the liquid is drawn from the common liquid chamber 10 to the individual liquid chamber 6. In the end, the meniscus surface becomes stable due to the balance between the negative pressure regulated by the supply tank, the circulation tank, and the water head difference and the surface tension of the meniscus, which makes the next discharging action ready.

The drive method of the head is not limited to the above-mentioned (pull-push discharging). The way of discharging changes, for example, pull discharging or push discharging, depending on how a drive waveform is applied. In addition, in the embodiment described above, the pressure-generating device to change the pressure to the individual liquid chamber 6 is a laminated piezoelectric element but is not limited thereto. For example, a piezoelectric element having a thin film-like form can be used. Moreover, it is also possible to use a heat element which is disposed in the individual liquid chamber 6 and generates heat to produce air bubbles to change the pressure or an element causing a pressure change utilizing the electrostatic force.

Next, an example of the liquid circulation system using the liquid discharging head relating to the present embodiment is described with reference to FIG. 7.

Figure 7:
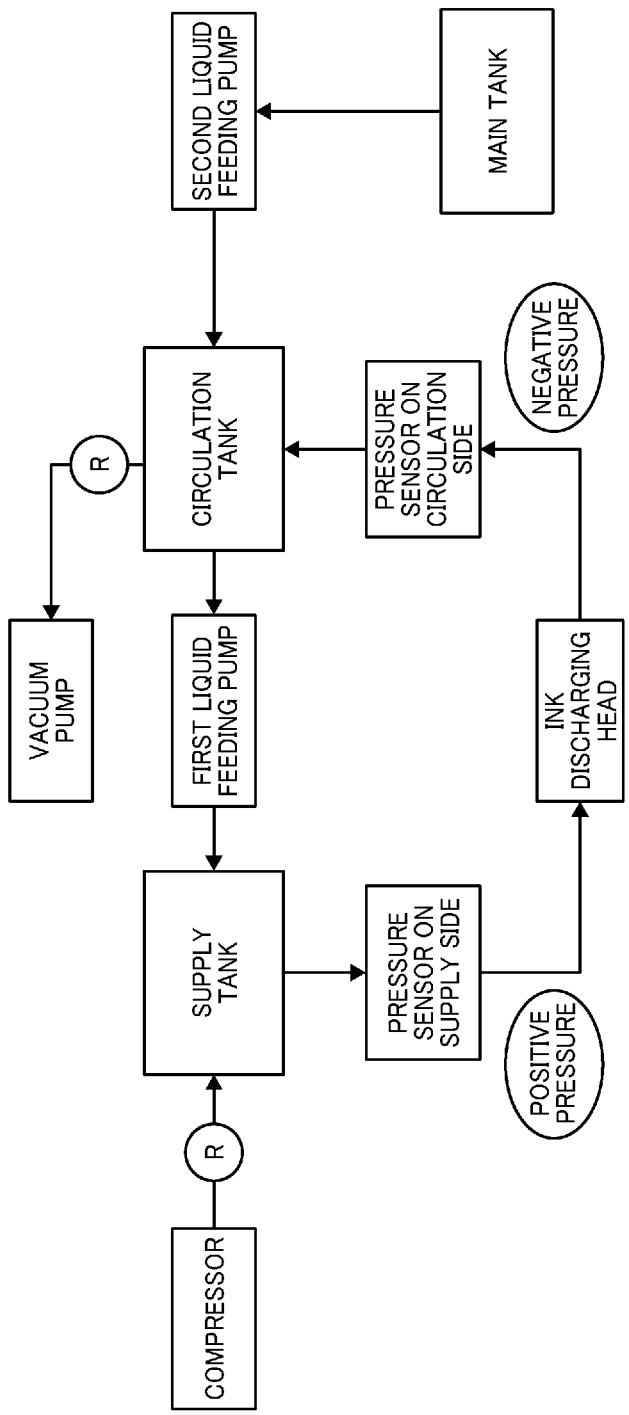
FIG. 7 is a block diagram illustrating an example of the liquid circulation system relating to the present disclosure.

FIG. 7 is a block diagram illustrating the liquid circulation system relating to the present embodiment of the present disclosure.

As illustrated in FIG. 7, the liquid circulation system includes a main tank, a liquid discharging head, a supply tank, a circulation tank, a compressor, a vacuum pump, a liquid feeding pump, a regulator (R), a pressure sensor on the supply side, a pressure sensor on the circulation side, etc. The pressure sensor on the supply side is disposed between the supply tank and the liquid discharging head and connected on the supply flow channel side connected with the supply port 71 (FIG. 1) of the liquid discharging head. The pressure sensor on the circulation side is disposed between the liquid discharging head and the circulation tank and connected on the circulation flow channel side connected with the circulation port 81 (FIG. 1) of the liquid discharging head.

One end of the circulation tank is connected to the supply tank via the first liquid feeding pump and, the other end, with the main tank via the second liquid feeding pump. Due to this configuration, the liquid flows from the supply tank into the liquid discharging head through the supply port 71 and ejected to the circulation tank through the circulation port. Furthermore, the liquid is sent from the circulation tank to the supply tank by the first liquid feeding pump to circulate the liquid.

In addition, a compressor is connected to the supply tank, which is controlled in order that the pressure sensor on the supply side can detect a predetermined positive pressure. In addition, a vacuum pump is connected to the circulation tank, which is controlled in order that the pressure sensor on the circulation side can detect a predetermined negative pressure. Therefore, the negative pressure of the meniscus can be maintained constant while circulating the liquid through the liquid discharging head.

In addition, as a liquid droplet is discharged from the nozzle of the liquid discharging head, the amount of the liquid in the supply tank and the circulation tank decreases. Therefore, it is desirable to replenish the liquid from the main tank to the circulation tank using the second liquid feeding pump on suitable occasions. When to replenish the liquid from the main tank to the circulation tank can be controlled based on the detection result of, for example, a liquid surface sensor disposed in the circulation tank to replenish the liquid when the liquid surface height of the liquid in the circulation tank becomes lower than a predetermined height.

Next, the liquid circulation in the liquid discharging head is described. As illustrated in FIG. 1, the supply port 71 communicating with the common liquid chamber and the circulation port 81 communicating with the circulation common liquid chamber 50 are formed at ends of the common liquid chamber member 20. The supply port 71 and the circulation port 81 are respectively jointed to the liquid supply tank 21 and the circulation tank 41 (FIG. 7) to store the liquid via respective tubes.

The liquid stored in the ink supply tank 21 is supplied to the individual liquid chamber 6 via the supply port 71, the common liquid chamber 10, the liquid introducing portion 8, and the fluid resistance 7.

Moreover, while a piezoelectric member 12 is driven to discharge the liquid in the individual liquid chamber 6 from the nozzle 4, the liquid accumulated in the individual liquid chamber 6 without being discharged entirely or partially circulates into the circulation tank via the fluid resistance 51, the circulation flow channels 52 and 53, the circulation common liquid chamber 50, and the circulation port 81.

The liquid can be circulated during both operation and downtime of the liquid discharging head. Circulation of the liquid during downtime is preferable because the liquid in the individual liquid chamber 6 is always refreshed and the components contained in the liquid is prevented from agglomerating or settling out.

Figure 10:
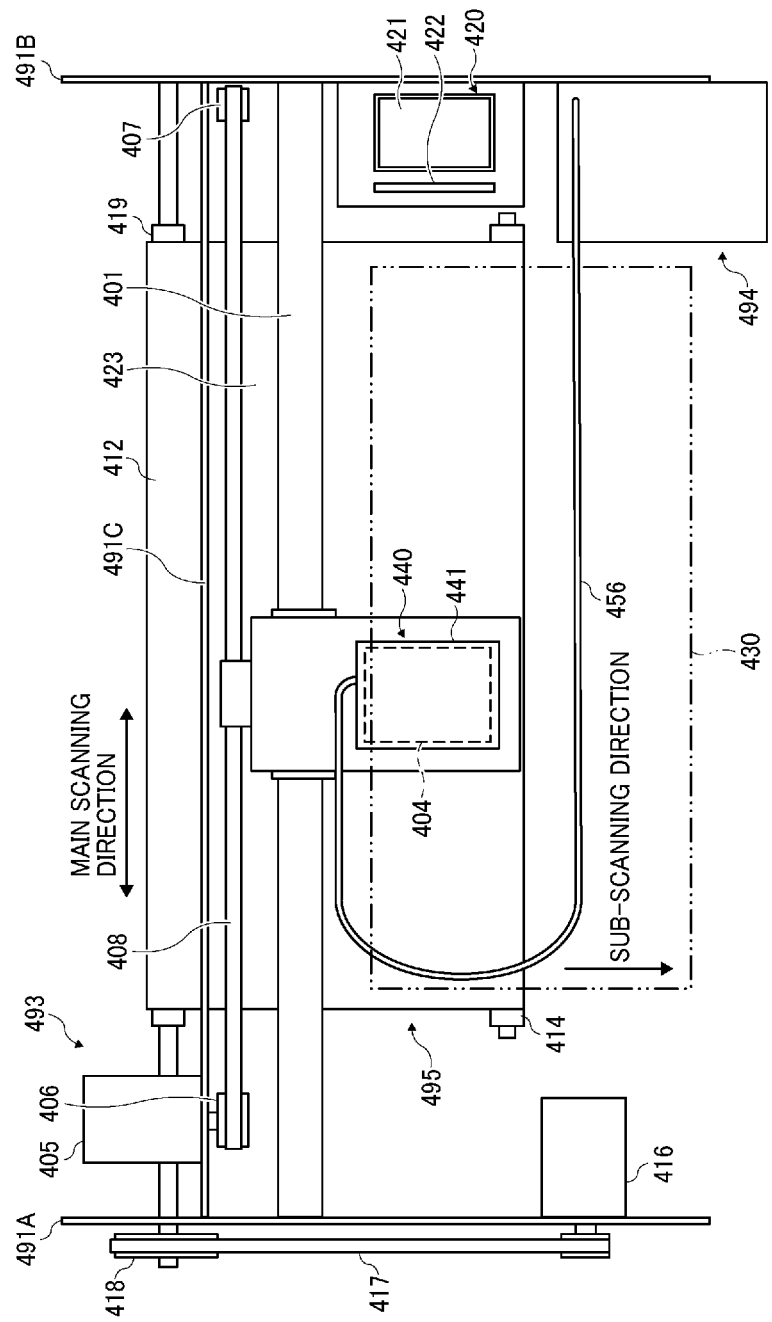
FIG. 10 is a diagram of a planar view illustrating an example of the substantial part of a device to discharge a liquid relating to the present disclosure.
Figure 11:
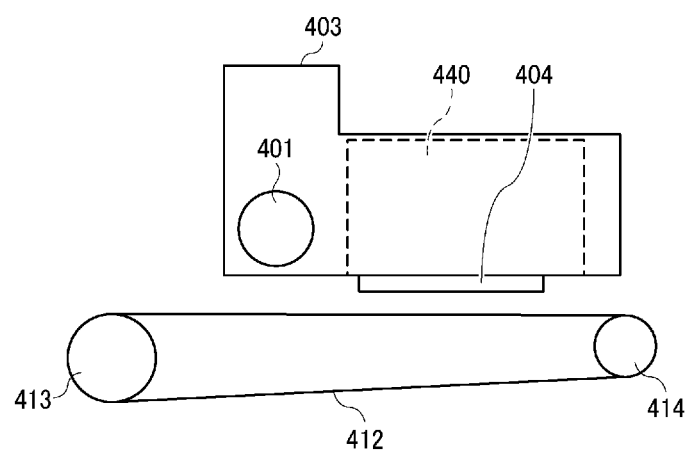
FIG. 11 is a diagram illustrating a side view of the substantial part of the ink discharging device illustrated in FIG. 10.

One embodiment of the device to discharge a liquid of the present disclosure is described with reference to FIG. 10 and FIG. 11. FIG. 10 is a diagram illustrating a plane view illustrating an example of the substantial part of the device and FIG. 11 is a diagram illustrating a side view of the substantial part of the device.

This device is a serial type, and a main scanning moving assembly 493 reciprocates the carriage 403 in the main scanning direction. The main scanning moving assembly 493 includes a guiding member 401, a main scanning motor 405, a timing belt 408, etc. The guiding member 401 is bridged between a side plate 491A and a side plate 491B on the right and left sides, respectively and holds the carriage 403 movable. The main scanning motor 405 reciprocates the carriage 403 in the main scanning direction via the timing belt 408 stretched between a drive pully 406 and a driven pully 407. A liquid discharging unit 440 carrying a liquid discharging head 404 relating to the present disclosure is mounted on the carriage 403. The liquid discharging head 404 of the liquid discharging unit 440 discharges color liquids of, for example, yellow (Y), cyan (C), magenta (M), and black (K). The liquid discharging head 404 carries a nozzle line having multiple nozzles disposed along the sub-scanning direction vertical to the main scanning direction with the ink discharging surface downward. The supply and circulation assembly 494 to supply the liquid stored outside the liquid discharging head 404 to the liquid discharging head 404 supplies and circulates the liquid in the liquid discharging head 404. In this embodiment, the supply and circulation assembly 494 includes a supply tank, a circulation tank, a compressor, a vacuum pump, a liquid feeding pump, a regulator (R), etc. The pressure sensor on the supply side is disposed between the supply tank and the liquid discharging head 404 and connected on the supply flow channel side connected to the supply port 71 of the liquid discharging head 404. The pressure sensor on the circulation side is disposed between the liquid discharging head 404 and the circulation tank and connected on the circulation flow channel side connected to the circulation port 81 of the liquid discharging head 404.

This device includes a conveyance assembly 495 to convey a recording medium 410. The conveyance assembly 495 includes a conveyor belt 412 as a conveying device and a sub-scanning motor 416 to drive the conveyor belt 412.

The conveyor belt 412 adsorbs the recording medium 410 and conveys the recording medium 410 to the position facing the liquid discharging head 404. The conveyor belt 412 has an endless form, stretched between a conveyor roller 413 and a tension roller 414. The conveyor belt 412 electrostatically adsorbs or aspirates the recording medium 410.

The conveyor belt 412 is moved around in the sub-scanning direction by the conveyor roller 413 rotationally driven by the sub-scanning motor 416 via a timing belt 417 and a timing pully 418.

Furthermore, on one side of the carriage 403 in the main scanning direction, a maintenance and recovery assembly 420 to maintain and recover the liquid discharging head 404 is disposed at the side of the conveyor belt 412.

The maintenance and recovery assembly 420 includes a capping member 421 to cap the nozzle surface (surface on which the nozzle is formed) of the liquid discharging head 404, a wiping member (wiper) 422 to wipe off the nozzle surface, etc. The main scanning moving assembly 493, the supply and circulation assembly 494, the maintenance and recovery assembly 420, and the conveyance assembly 495 are mounted onto a housing including the side plates 491A and 491B and a back plate 491C.

In the image forming device having such a configuration, the recording medium 410 is fed and adsorbed onto the conveyor belt 412 and conveyed along the sub-scanning direction by the rotational movement of the conveyor belt 412.

Thereafter, the liquid discharging head 404 is driven in response to an image signal and at the same time the carriage 403 is moved in the main-scanning direction so that the ink is discharged onto the recording medium 410 standing still to record an image.

Since the liquid discharging head relating to the present disclosure is provided in this device, quality images can be stably formed.

Figure 12:
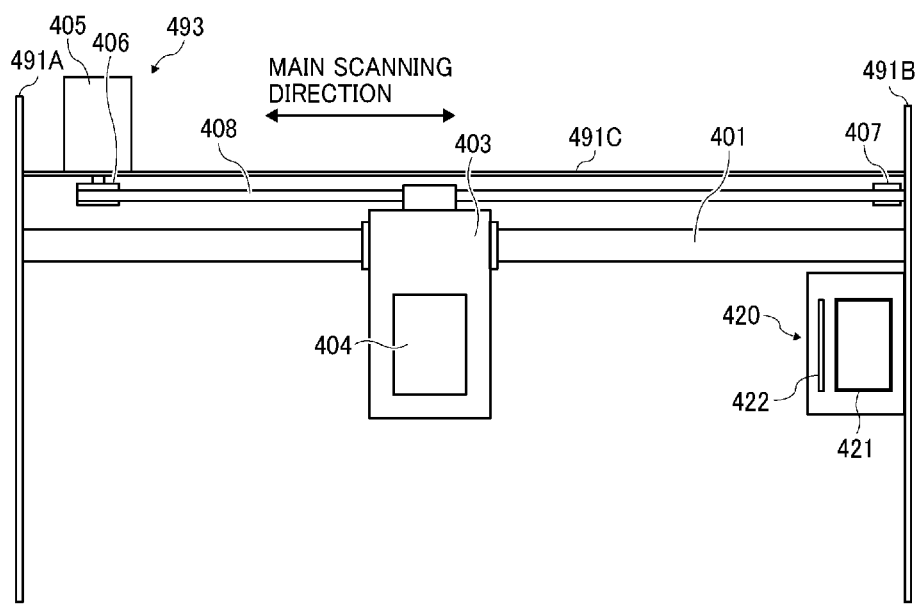
FIG. 12 is a plane diagram illustrating another example of the substantial part of a liquid discharging unit relating to the present disclosure.

Next, another example of the liquid discharging unit relating to the present disclosure is described with reference to FIG. 12. FIG. 12 is a diagram of a plane diagram illustrating the substantial part of the liquid discharging unit.

Of the members constituting the device to discharge the liquid, this liquid discharging unit includes the housing portion including the side plates 491A and 491B and the back plate 491C, the main scanning moving assembly 493, the carriage 403, and the liquid discharging head 404.

Optionally, this liquid discharging unit may have a configuration such that at least one of the maintenance and recovery assembly 420 and the supply and circulation assembly 494 is further mounted onto, for example, the side plate 491B.

In the present disclosure, the liquid discharging head is a mechanical part to discharge and jet liquid from nozzles.

The liquid is not particularly limited and it is possible to use any liquid having a viscosity and a surface tension with which the liquid can be discharged from a head. Liquid having a viscosity of 30 mPa-s at room temperature and normal pressure or under heating or cooling is preferable. More specifically, examples are solutions, suspensions, emulsions, etc., such as water and organic solvents, colorants such as dyes and pigments, function-imparting materials such as polymerizable compounds, resins, and surfactants, biocompatible materials such as DNA, amino acids, proteins, and calcium, eatable materials such as natural coloring matter. These can be used for, for example, ink for inkjet, surface treatment liquid, forming liquid for structure elements for electronic elements and luminous elements and electronic circuit resist pattern, and liquid materials for three-dimensional fabrication.

Articles using piezoelectric actuators (a laminate type piezoelectric element and thin-layer type piezoelectric element), thermal actuators using the thermoelectric conversion element such as a heat element, and an electrostatic actuator including a diaphragm and a counter electrode are suitable as the energy generating source to discharge liquid.
The liquid discharging unit is a collective form in which a functional part and/or an assembly is integrated into the liquid discharging head, meaning a collection of parts relating to liquid discharging. For example, the liquid discharging unit includes a combination of the liquid discharging head and at least one of the supply and circulation assembly, the carriage, the maintenance and recovery assembly, and the main scanning moving assembly.
Integration means that, for example, the liquid discharging head is mutually fastened, glued, engaged, etc. with functional parts or assembly or one is held by the other in a movable manner. In addition, the liquid discharging head and the functional parts or assembly may be configured to be detachably attachable to each other.
For example, the liquid discharging head may be integrated with the supply and circulation mechanism to form the liquid discharging unit. In addition, the liquid discharging head can be integrated with the supply and circulation mechanism by mutually being jointed by a tube, etc. Optionally, a unit including a filter may be additionally disposed between the liquid discharging head and the supply and circulation assembly of the liquid discharging unit.
In addition, the liquid discharging head may be integrated with the carriage to form the liquid discharging unit.

In addition, the liquid discharging head may be integrated with a scanning moving assembly as the liquid discharging unit while the liquid discharging head is held in a movable manner by the guiding member constituting a part of the scanning moving assembly.

In addition, the liquid discharging head, the carriage, and the maintenance and recovery mechanism may be integrated as the liquid discharging unit while the capping member constituting a part of the maintenance and recovery mechanism is fastened to the carriage onto which the liquid discharging head is mounted.

In addition, the ink discharging head and the supply and circulation assembly may be integrated as the ink discharging unit while the tube is jointed with the ink discharging head onto which the supply and circulation assembly or the flow channel parts are mounted. Via this tube, the liquid in the liquid storage portion is supplied to the liquid discharging head.

The main scanning moving assembly includes the guiding member. In addition, the supplying assembly includes the tube and the installation unit.

In the present disclosure, the device to discharge a liquid (liquid discharging device) includes a liquid discharging head or a liquid discharging unit and drives the liquid discharging head to discharge the liquid. The device to discharge a liquid includes not only a device capable of discharging the liquid onto a medium to which the liquid is attachable but also a device that discharges the liquid into air or liquid.
The device to discharge a liquid may include a unit that feeds, conveys, or ejects a medium to which the liquid can be attached, a pre-processing device, a post-processing device, etc.
For example, the device to discharge a liquid includes an image forming apparatus which discharges ink onto a recording medium to form an image thereon and a solid freeform fabrication device (three-dimensional modeling device) which discharges a liquid fabrication (modeling liquid) to laminar powder layers to fabricate a solid freeform object (three dimensional object).

In addition, the device to discharge a liquid is not limited to an article which produces meaningful visible images such as texts and figures with the discharged liquid. For example, the device to discharge a liquid may form meaningless patterns or 3D objects.

What the liquid is attachable to means what the liquid can be attached to even temporarily and material to which liquid is attached and caused to adhere or is attached and permeates.

Specific examples include, but are not limited to, recording media such as paper, recording paper, film, and cloth, electronic devices such as electronic substrates and piezoelectric elements, powder layer, internal organ models, cells for checking. Unless particularly specified, all to which liquid can be attached is included.

The material to which the liquid can be attached is anything to which the liquid can be attached even temporarily. Specific examples include, but are not limited to, paper, thread, fiber, cloth, leather, metal, plastics, glass, wood, and ceramics.

The liquid is not particularly limited and it is possible to use any liquid having a viscosity and a surface tension with which the liquid can be discharged from a head. Liquid having a viscosity of 30 mPa·s at room temperature and normal pressure or under heating or cooling is preferable. More specifically, examples are solutions, suspensions, emulsions, etc., such as water and organic solvents, colorants such as dyes and pigments, function-imparting materials such as polymerizable compounds, resins, and surfactants, biocompatible materials such as DNA, amino acids, proteins, and calcium, eatable materials such as natural coloring matter. These can be used for, for example, ink for inkjet, surface treatment liquid, forming liquid for structure elements for electronic elements and luminous elements and electronic circuit resist pattern, and liquid materials for three-dimensional fabrication.

The device to discharge a liquid (liquid discharging device) includes a device in which the liquid discharging head and an article to which liquid can be attached relatively move to each other but is not limited thereto.
Specific examples include, but are not limited to, a serial type device in which the liquid discharging head is caused to move and a line type device in which the liquid discharging head is not caused to move.

In addition, other examples of the device to discharge a liquid are a processing fluid applicator to discharge a processing fluid to a recording medium to apply the processing fluid to the surface of the recording medium to reform the surface and a jet granulator to granulate fine particles of raw materials by jetting a liquid composition in which the raw materials are dispersed in a solution through nozzles.

Cured Material and Method of Manufacturing Cured Material

The cured material of the present disclosure is made from the curable liquid composition of the present disclosure. To manufacture the cured material, a liquid composition discharging device equipped with a discharging head is caused to discharge the curable liquid composition of the present disclosure and the discharged curable liquid composition cures upon irradiation of light.

In addition, the cured material of the present disclosure can be manufactured by a method including discharging the curable liquid composition of the present disclosure with the liquid composition discharging device described above including a discharging head including multiple nozzles to discharge a liquid, individual liquid chambers communicating with the nozzles, a common liquid chamber to supply the liquid to the individual liquid chambers, a circulating flow channel communicating with the individual liquid chambers, a common circulation liquid chamber communicating with the circulating flow channel, and a pressure generating device to apply a pressure to the liquid in the individual liquid chambers and irradiating the curable liquid composition with light to cure.

The method of using the composition of the present disclosure is not limited to the liquid discharging method using a device to discharge a liquid.

Specific examples of such methods other than the liquid discharging method include, but are not limited to, blade coating methods, gravure coating methods, bar coating methods, roll coating methods, dip coating methods, curtain coating methods, slide coating methods, die coating methods, and spray coating methods.

Moreover, image forming, recording, printing, modeling, etc. in the present disclosure represent the same meaning.

Applied Substrate

Applied substrates (also referred to as print substrates) are not particularly limited. In terms of curing and drying upon irradiation of light, substrates having a low permeability such as paper, plastic, metal, and glass having a coated layer are particularly preferable in comparison with substrates having a high permeability, in which liquid permeates deep inside where light cannot reach.

Embodiments of the present disclosure can be the following 1 to 10.

1. A curable liquid composition includes a monomer having an SI value of less than 3.0 and a photopolymerization initiator having a weight average molecular weight of 500 or greater, wherein the curable liquid composition is negative in skin sensitization.

2. The curable liquid composition according to 1 mentioned above, wherein the photopolymerization initiator includes at least one of a phenyl glyoxylate skeleton and a benzophenone skeleton.

3. The curable liquid composition according to 1 mentioned above, wherein the photopolymerization initiator has a chemical structure containing a nitrogen atom.

4. The curable liquid composition according to any one of 1 to 3 mentioned above, wherein the monomer includes a hydroxyl group-containing monomer.

5. A composition-accommodating container accommodates the curable liquid composition of any one of 1 to 4 mentioned above.

6. A liquid composition discharging device includes the composition-accommodating container of 5 mentioned above.

7. A liquid composition discharging device includes a discharging head to discharge the curable liquid composition of any one of 1 to 4 mentioned above, the discharging head including multiple nozzles to discharge liquid, individual liquid chambers communicating with the nozzles, a common liquid chamber to supply the liquid to the individual liquid chambers, a circulating flow channel communicating with the individual liquid chambers, a circulating common liquid chamber communicating with the circulation flow channel, and a pressure generating device to apply a pressure to the liquid in the individual liquid chambers.

8. A cured material of the curable liquid composition of any one of claims 1 to 4.

9. A method of manufacturing a cured material includes discharging the curable liquid composition of any one of 1 to 4 mentioned above by a liquid composition discharging device including a discharging head and irradiating the curable liquid composition with light for curing.

10. A method of manufacturing a cured material includes
discharging the curable liquid composition of any one of claims 1 to 4 with a liquid composition discharging device including a discharging head including multiple nozzles to discharge a liquid, individual liquid chambers communicating with the nozzles, a common liquid chamber to supply the liquid to the individual liquid chambers, a circulating flow channel communicating with the individual liquid chambers, a common circulation liquid chamber communicating with the circulating flow channel, and a pressure generating device to apply a pressure to the liquid in the individual liquid chambers and irradiating the curable liquid composition with light for curing.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto.

Evaluation Method of SI Value

The SI value was measured in the manner described below according to the skin sensitization test in accordance with the Local Lymph Node Assay (LLNA) method.

Test Material

Positive Control Substance

α-hexylcinnamaldehyde (HCA; product of FUJIFILM Wako Pure Chemical Corporation) was used as positive control material.

Medium

A liquid mixture containing acetone (product of FUJIFILM Wako Pure Chemical Corporation) and olive oil (product of Fudimi Pharmaceutical Co., Ltd.) in a volume ratio of 4 to 1 was used as medium.

Tested Animal

For each of the test substances, the positive control, or the medium control, female mice were acclimated for 8 days including 6-day quarantine. No abnormalities were found in all the mice during the quarantine/acclimation period.

Based on the body weights measured two days before the initiation of sensitization, the mice were categorized into 2 groups (4 mice/group) by the body weight stratified random sampling method so that the body weight of each individual was within −20 to +20 percent of the average body weight of all the individuals. Each of the tested animals was 8 to 9 weeks old at the time of the initiation of sensitization. The individuals not classified into the groups were excluded from the test.

The tested animals were individually identified by application of oil ink to their tales throughout the test period. Also their cages were labeled for identification.

Housing Environment

Throughout the housing period including the quarantine/acclimation period, the tested animals were housed in an animal room with a barrier system, which was set as follows: 21 to 25 degrees C. in temperature, 40 to 70 percent in relative humidity, 10 to 15 times/hour in frequency of air circulation, and a 12 hour-interval lighting cycle (lighted from 7:00 to 19:00).

The housing cages used were made of polycarbonate. The number of the tested animals were raised in 4 animals per cage.

The tested animals were given ad libitum solid feed for laboratory animals MF (product of Oriental Yeast Co., Ltd.). Also, using a water-supply bottle, the tested animals were given ad libitum tap water in which sodium hypochlorite (PURELOX, product of OYALOX Co., Ltd.) had been added in order that the chlorine concentration was about 5 ppm. Bedding used was SUNFLAKE (fir tree, shavings obtained with a power planer, product of Charles River Laboratories International, Inc.). The feed and all of the feeding equipment were sterilized with an autoclave (121 degrees C., 30 minutes) before use.

The housing cage and the bedding were replaced at the times of the categorization and the removal of the auricular lymph node (i.e., the time when the animals were transferred from the animal room), and the water-supply bottle and rack were replaced at the time of the categorization.

Test Method

Group Composition

The group compositions of the medium control group and positive control group used for the measurement of the SI value are shown in Table 1.

TABLE 1

| Test group | Sensitization material | Amount of sensitization (μL/auricular) | Number of sensitization | Number of animals (animal number) |
|---|---|---|---|---|
| Medium control group | Medium only | 25 | Once per day × 3 days | 4 (1 to 4) |
| Positive control group | 25.0 percent HCA | 25 | Once per day × 3 days | 4 (5 to 8) |

Preparation

Test Substance

Table 2 shows the weighing condition of the test substance. The test substance was weighed in a measuring flask, and the volume of the test substance was adjusted to 1 mL while adding the medium. The thus-prepared test substance solution was placed in a light-shielded airtight container (made of glass).

TABLE 2

| | Adjusted concentration (w/v percent) | Test substance weigh (g) |
|---|---|---|
| Test substance | 50.0 | 0.5 |

Positive Control Substance

About 0.25 g of HCA was accurately weighed, and the medium was added to the HCA to have a total volume of 1 mL to obtain a 25.0 percent by mass liquid. The thus-prepared test substance was placed in a light-shielded airtight container (made of glass).

BrdU 200 mg of 5-bromo-2'-deoxyuridine (BrdU, product of NACALAI TESQUE, INC.) was accurately weighed in a measuring flask. Thereafter, physiological saline (product of Otsuka Pharmaceutical Factory, Inc.) was added into the measuring flask, and dissolved upon application of ultrasonic waves. Thereafter, the volume of the resultant solution was adjusted to 20 mL to prepare a 10 mg/mL solution (BrdU preparation solution). The BrdU preparation solution was sterilized through filtration with a sterilized filtration filter and placed in a sterilized container.

Preparation Timing and Storage Period

The positive control preparation solution was prepared on the day before the initiation of sensitization, and stored in a cold place when not in use. The medium and the test substance preparation solutions were prepared on each day of sensitization. The BrdU preparation solution was prepared two days before administration and stored in a cold place until the day of administration.

Sensitization and Administration of BrdU

Sensitization

The preparation solution and the medium of each test substance and positive control substance were applied to both ears of each animal in an amount of 25 μL for each. A micropipettor was used for application. The tested animals were subjected to this treatment once a day for three consecutive days.

Administration of BrdU

About 48 hours after the final sensitization, the BrdU preparation solution (0.5 mL) was intraperitoneally administered once to each of the tested animals.

Observation and Examination

General Conditions

All the animals used for the test were observed once or more times a day from the day of the initiation of sensitization to the day of the removal of the auricular lymph node (i.e., the day when the animals were transferred from the animal room). Notably, the observation day was counted from the day of the initiation of sensitization as Day 1.

Measurement of Body Weights

The body weight of each of the tested animals was measured on the day of the initiation of sensitization and on the day of the removal of the auricular lymph node (i.e., the day when the animals were transferred from the animal room). Also, the weight average and the standard error for each group were calculated.

Removal of Auricular Lymph Node and Measurement of Weight Thereof

About 24 hours after the administration of BrdU, the tested animals were allowed to undergo euthanasia, and their auricular lymph nodes were sampled. The surrounding tissue of each auricular lymph node was removed, and the auricular lymph nodes from both the auricles were collectively weighed. Also, the weight average and the standard error of the auricular lymph nodes for each group were calculated. After the weight measurement, the auricular lymph nodes of each individual were stored in a frozen state using a BIO MEDICAL FREEZER set to −20 degrees C.

Measurement of BrdU Intake

After returning the auricular lymph nodes to room temperature, the auricular lymph nodes were mashed with the gradual addition of physiological saline, and suspended therein. The thus-obtained suspension was filtrated and thereafter dispensed into a 96-well microplate 3 wells by 3 wells per individual. The thus-dispensed suspensions were measured for intake of BrdU according to the ELISA method. The reagents used were a commercially available kit (Cell Proliferation ELISA, BrdU colorimetric, Cat. No. 1647229, product of Roche Diagnostics K.K.). A multiplate reader (FLUOstar OPTIMA, product of BMG LABTECH Inc.) was used to measure the absorbance of each individual (OD: 370 to 492 nm, the intake of BrdU), and the average of the absorbance of the 3 wells was used as the measurement of BrdU for the individual.

Evaluation of Results

Calculation of Stimulation Index (SI)

As shown in the following relation, the measurement of BrdU intake for each individual was divided by the average of the measurements of BrdU intake in the vehicle control group to calculate the SI value for the individual. The average of the SI values of the individuals was defined as the SI value of each test group. Notably, the SI value was rounded at the second decimal place and shown to the first decimal place.

SI={Average of BrdU measuring values of individuals (average of 3 wells)}/{Average of BrdU measuring values of medium control group (average of 4 mice)

Examples 1 to 9 and Comparative Examples 1 to 4

The following materials A to C shown in Table 3 were mixed at ratios (parts by mass) shown in the columns of Examples and Comparative Examples in Table 3 to prepare inks.

A: Monomer having SI value of less than 3.0 Naturally, articles determined as negative by other methods and devices are included herein.

B: Photopolymerization initiator having a molecular weight of less than 500

C: Photopolymerization initiator having a molecular weight of 500 or more

Details of A1 to A8, B1 to B3, and C1 to C6 shown in Table are as follows: The values in parentheses at the ends are SI values in the LLNA test, and "None" means "negative for skin sensitization" or "no skin sensitization" in the SDS (Safety Data Sheet). "No pictograms of The Globally Harmonized System of Classification and Labelling of Chemicals (GHS) indicating hazard statement in SDS" means no skin sensitization.

The inks of Examples 1 to 9 and Comparative Examples 1 to 3 were composed of only materials having negative skin sensitization properties and were negative for skin sensitization. However, since the ink of Comparative Example 4 contained the photopolymerization initiator B3 having an SI value of 10.0 in an amount of 10 percent by mass in the ink, that ink was positive for skin sensitization.

A1: Diethylene glycol dimethacrylate "2G", manufactured by Shin-Nakamura Chemical Co., Ltd. (1.1)

A2: Caprolactone-modified dipentaerythritol hexaacrylate "DPCA 60", manufactured by Nippon Kayaku Co., Ltd. (none: evaluation by SDS)

A3: Ethylene oxide-modified bisphenol A diacrylate "BPE-10", manufactured by DKS Co. Ltd. (1.2)

A4: Polypropylene glycol diacrylate "M-270", manufactured by TOAGOSEI CO., LTD. (1.5)

A5: Isostearyl acrylate "S-1800A", manufactured by Shin-Nakamura Chemical Co., Ltd. (1.4)

A6: Tricyclodecanedimethanol dimethacrylate "DCP" manufactured by Shin-Nakamura Chemical Co., Ltd. (1.3)

A7: Glycerol dimethacrylate "701", manufactured by Shin-Nakamura Chemical Co., Ltd. (1.2)

A8: Glycerol monomethacrylate "GLM", manufactured by NOF CORPORATION (1.1)

B1: 1-[4-(2-hydroxyethoxy)-phenyl]-2-hydroxy-2-methyl-1-propane-1-one "Omnirad 2959", manufactured by IGM Resins B.V. (none: evaluation by SDS), weight average molecular weight of 224

B2: 1-hydroxy-cyclohexyl-phenyl-ketone "Omnirad 184", manufactured by IGM Resins B.V. weight average molecular weight of 204, (none: evaluation by SDS)

B3: 2-(dimethylamino)-1-(4-morpholinophenyl)-2-benzyl-1-butanone "Omnirad 369", manufactured by IGM Resins B.V., weight average molecular weight of 366, (10)

C1: Polybutylene glycol-bis-phenyl glyoxylate "Ominipol 2712", manufactured by IGM Resins B.V., weight average molecular weight of 514, "no pictograms of Globally Harmonized System (GHS) indicating hazard statement in SDS"

C2: Diester of polytetramethylene glycol 250 and carboxymethoxybenzophenone "OminipolBP", manufactured by IGM Resins B.V., weight average molecular weight of 730, "no pictograms of Globally Harmonized System (GHS) indicating hazard statement in SDS"

C3: Diester of polyalkylene glycol and carboxybenzophenone "Ominipol 2702" manufactured by IGM Resins B.V., weight average molecular weight of 620, "no pictograms of Globally Harmonized System (GHS) indicating hazard statement in SDS"

C4: Polyethylene glycol-bis-dimethylaminobenzoate "Ominipol ASA", manufactured by IGM Resins B.V., weight average molecular weight of 510, "no pictograms of Globally Harmonized System (GHS) indicating hazard statement in SDS"

C5: Diester of polytetramethylene glycol 250 and carboxymethoxy thioxanthone "Ominipol TX", manufactured by IGM Resins B.V., weight average molecular weight of 790, "no pictograms of Globally Harmonized System (GHS) indicating hazard statement in SDS"

C6: Polyethylene glycol 200-di-(β-4 [4-(2-dimethylamino-2-benzyl)butanoylphenyl]piperazine) propionate "Ominipol 910", manufactured by IGM Resins B.V., weight average molecular weight of 1039, "no pictograms of Globally Harmonized System (GHS) indicating hazard statement in SDS"

Curability and Odor of Cured Coated Film

Curability and odor of the cured coated film were evaluated for each ink. The evaluation results of each ink are shown in Table 3.

A commercially available polyethylene terephthalate film (COSMOSHINE, thickness of 188 microns, manufactured by TOYOBO CO., LTD.) was used for the substrate as a general-purpose film material. The ink was discharged onto the film by inkjetting to form a coated film thereon. The coated film was irradiated with light having an illuminance and cumulative light amount shown in Table 3 by a metal halide lamp (LightHammer 6, manufactured by Heraeus Co.). When the coated film was finger-touched and did not feel sticky, the coated film was determined as cured. Uncured or semi-cured film was determined as uncured. Also, after the light irradiation for one hour, the odor of the coated film was evaluated by sensory evaluation and the coated film having a strong odor was determined as "pungent odor" and the coated film having a weak odor as "light odor".

The coated film was subjected to a curability test 1 with a small amount of light irradiation and a curability test 2 with a large amount of irradiation as the curability test. The coated film cured in the curability test 2 with irradiation in a large amount of light although it did not cure the curability test 1 with irradiation in a small amount of light. In general, curability depends on the amount of radical generated at the time of light irradiation. Therefore, to cause the coated film to cure with a smaller amount of light, it is suitable to increase the amount of a photopolymerization initiator serving as a radical generating source. However, as the addition amount of the photopolymerization initiator is increased, viscosity of the ink is increased or the cost is increased. Note that the coated film obtained in the curability test 2 shown in Table 3 was subjected to the evaluation of the odor of the coated film.

First, the ink was accommodated in an aluminum pouch bag having a form illustrated in FIG. 13 and the pouch bag was sealed in order to prevent air bubbles from entering into the pouch bag and the ink. The sealed pouch bag was accommodated in the plastic cartridge as illustrated in FIG. 14. In a housing capable of accommodating the cartridge, an ink flow channel was provided from the cartridge to a head (MH5420, a discharging head having no flow channel circulating in the individual liquid chambers, manufactured by Ricoh Co., Ltd.). Through the flow channel, the ink was discharged by inkjetting to form a solid image having a size of 3 cm×10 cm. The ink droplet discharging amount was controlled in order that the thickness of the coated film was about 20 microns.

The property of the ink desirably satisfies the requirements of the inkjet discharging head to be used. Various discharging heads are available from many manufacturers, and some have a large discharging power to discharge an ink having a high viscosity or a wide range of thermostat setting. In this context, it is preferable to use an ink having a viscosity of from 2 to 150 mPa·s at 25 degrees C. and, more preferable, from 5 to 18 mPa·s assuming discharging at 25 degrees C. However, as described above, the thermostat of the discharging head can be used. When the viscosity is too high at 25 degrees C., the head may be heated to reduce the viscosity of the ink. When heated to 60 degrees C., the ink preferably has a viscosity of from 2 to 20 mPa·s and more preferably from 5 to 18 mPa·s at 60 degrees C. However, from viewpoints of energy saving and operation preparation time, discharging the ink at a lower temperature is more preferable. In Comparative Examples and Examples, the ink viscosity was 8 to 15 mPa·s at a discharging temperature of from 30 to 60 degrees C.

TABLE 3

|  |  | Example 1 | Example 2 | Example 3 | Example 4 | Example 5 |
|---|---|---|---|---|---|---|
| Monomer (A) | A1 (Diethylene glycol dimethacrylate) | 50 | 50 | 50 | 50 |  |
|  | A2 (Caproloctone-modified |  |  |  |  |  |
|  | A2 (Caprolactone-modified dipentaerythritol hexaacrylate) |  |  |  | 10 |  |
|  | A3 (Ethylene oxide-modified bisphenol A diacrylate) |  |  |  | 20 |  |
|  | A4 (Polypropylene glycol diacrylate) |  |  |  | 20 |  |
|  | A5 (Isostearyl acrylate) |  |  |  |  | 10 |
|  | A6 (Tricyclodecanedimethanol dimethyacrylate) |  |  |  |  | 90 |
|  | A7 (Glycerol dimethacrylate) | 50 | 50 | 50 |  |  |
|  | A8 (Glycerol monomethacrylate) |  |  |  |  |  |
| Photopolymerization initiator (B) | B1 (Ominirad 2959 MW 224) |  |  |  |  |  |
|  | B2 (Ominirad 184 MW = 164) |  |  |  |  |  |
|  | B3 (Ominirad 369 MW 366) |  |  |  |  |  |
| Photopolymerization initiator (C) | C1 Omnipol 2712 MW = 514 (average) | 30 | 5 | 10 | 10 |  |
|  | C2 (Omnipol BP MW 730 (average)) |  |  |  | 10 |  |
|  | C3 (Omnipol 2702 MW = 620 (average)) |  |  | 10 |  |  |
|  | C4 (Omnipol ASA MW = 510 (average)) |  |  |  | 3 |  |
|  | C5 (Omnipol TX MW = 790 (average)) |  |  |  | 3 |  |
|  | C6 (Omnipol 910 MW = 1039 (average)) | 10 |  |  |  |  |
| Coloring material | Carbon black (*2) |  |  |  | 2 |  |
| Evaluation result | Curability test 1 (3W/cm$^2$, 3 J/cm$^2$, @UVA: 315 to 400 nm) | Uncured | Cured | Cured | Uncured | Uncured |
|  | Curability test 2 (3W/cm$^2$, 5 J/cm$^2$, @UVA: 315 to 400 nm) | Cured | Cured | Cured | Cured | Cured |
|  | Odor of cured coated film (oraganeleptic evaluation conducted one hour after preparaion of the coated film) | Light smell | Light smell | Light smell | Light smell | Light smell |

|  |  | Example 6 | Example 7 | Example 8 | Example 9 |
|---|---|---|---|---|---|
| Monomer (A) | A1 (Diethylene glycol dimethacrylate) | 70 | 50 | 50 | 10 |
|  | A2 (Caprolactone-modified dipentaerythritol hexaacrylate) | 30 |  |  |  |
|  | A3 (Ethylene oxide-modified bisphenol A diacrylate) |  | 10 | 10 |  |
|  | A4 (Polypropylene glycol diacrylate) |  | 20 | 20 |  |
|  | A5 (Isotearyl acrylate) |  |  |  |  |
|  | A6 (Tricyclodecanedimethanol dimethacrylate) |  |  |  |  |
|  | A7 (Glycerol dimethacrylate) |  | 10 | 10 | 10 |
|  | A8 (Glycerol monomethacrylate) |  | 10 | 10 | 80 |
| Photopolymerization initiator (B) | B1 (Omnirad 2959 MW = 224) | 5 |  |  |  |
|  | B2 (Omnirad 184 MW 164) |  |  |  |  |
|  | B3 (Omnirad 369 MW 366) |  |  |  |  |
|  | C1 (Omnipol 2712 MW = 514 (average)) | 30 | 20 |  | 10 |
|  | C2 (Omnipol BP MW = 730 (average)) |  |  |  |  |
| Photopolymerization initiator (C) | C3 (Omnipol 2702 MW = 620 (average)) |  |  |  |  |
|  | C4 (Omnipol ASA MW = 510 (average)) |  |  |  |  |
|  | C5 (Omnipol TX MW 790 (average)) |  |  |  |  |
|  | C6 (Omnipol 910 MW = 1039 (average)) |  |  |  | 20 |
| Coloring material | Carbon black (*2) |  |  | 2 |  |
| Evaluation result | Curability test 1 (3W/cm$^2$, 3 J/cm$^2$, @UVA: 315 to 400 nm) | Cured | Cured | Cured | Cured with glass adhesiveness |
|  | Curability test 2 (3W/cm$^2$, 5 J/cm$^2$, @UVA: 315 to 400 nm) | Cured | Cured | Cured | Cured with glass adhesiveness |
|  | Odor of cured coated film (organoleptic evaulation conducted one hour after preparation of the coated film) | Light smell | Light smell | Light smell | Light smell |

|  |  | Comparative Example 1 | Comparative Example 2 | Comparative Example 3 | Comparative Example 4 |
|---|---|---|---|---|---|
| Monomer (A) | A1 (Diethylene glycol dimethacrylate) | 50 | 50 | 50 | 50 |
|  | A2 (Caprolactone-modified dipentaerythritol hexaacrylate) |  |  |  |  |
|  | A3 (Ethylene oxide-modified bisphenol A diacrylate) |  |  |  |  |
|  | A4 (Polypropylene glycol diacrylate) |  |  |  |  |
|  | A5 (Isostearyl acrylate) |  |  |  |  |
|  | A6 (Tricyclodecanedimethanol dimethacrylate) |  |  |  |  |
|  | A7 (Glycerol dimethacrylate) | 50 | 50 | 50 | 50 |
|  | A8 (Glycerol monomethacrylate) |  |  |  |  |
| Photopolymerization initiator (B) | B1 (Omnirad 2959 MW = 224) |  |  | 10 | 30 |
|  | B2 (Omnirad 184 MW 164) |  | 10 |  |  |
|  | B3 (Omnirad 369 MW = 366) |  |  |  | 10 |

TABLE 3-continued

| | | | | | |
|---|---|---|---|---|---|
| Photopolymerization initiator (C) | C1 (Omnipol 2712 MW = 514 (average))<br>C2 (Omnipol BP MW = 730 (average))<br>C3 (Omnipol 2702 MW = 620 (average))<br>C4 (Omnipol ASA MW = 510 (average))<br>C5 (Omnipol TX MW 790 (average))<br>C6 (Omnipol 910 MW = 1039 (average)) | | | | |
| Coloring material | Carbon black (*2) | | | | |
| | Curability test 1 (3W/cm$^2$, 3 J/cm$^2$, @UVA: 315 to 400 nm) | Uncured | Uncured | *1 | Cured |
| Evaluation result | Curability test 2 (3W/cm$^2$, 5 J/cm$^2$, @UVA: 315 to 400 nm) | Cured | Uncured | *1 | Cured |
| | Odor of cured coated film (organoleptic evaulation conducted<br>one hour after preparation of the coated film) | Pungent<br>odor | Light<br>smell | *1 | Pungent<br>odor |

*1: Undissolved, not evaluable
*2: Carbon blak #10 (skin sensitization negative at SDS evaluation, manufactured by Mitsubishi Chemical Corporation) including polymer dispersant (S3200, skin sensitization negative at SDS evaluation, manufactured by The Lubrizol Corporation) in a mass ratio of 3 to 1

As seen in Example 1 and Comparative Example 1, it was found that good curability and light (weak) odor were achieved at the same time due to the usage of an initiator having a molecular weight of 500 or more. Even with an initiator having a molecular weight of less than 500 as in Comparative Example 2, it is possible to reduce the odor to a low level. However, it is difficult to make both curability and compatibility good at the same time, and as seen in Comparative Example 3, an increase of the initiator to enhance curability was found to cause a solubility problem.

As seen in Example 2, good curability and light odor were achieved at the same time due to the usage of an initiator having a molecular weight of 500 or more. Due to the adjustment of the amount of the initiator, curability was found to be further enhanced.

As seen in Example 3, good curability and light odor were found to be achieved at the same time due to the usage of multiple kinds of initiators having a molecular weight of 500 or more.

As seen in Examples 4 to 6, good curability and light odor was found to be achieved at the same time even when an initiator having a molecular weight of 500 or more was used and multiple kinds of monomers having an SI value of less than 3.0 were used.

As seen in Example 6, good curability and light odor were found to be achieved at the same time when an initiator having a molecular weight of less than 500 was used in combination with an initiator having a molecular weight of 500 or more.

As seen in Examples 7 and 8, when an initiator having a molecular weight of 500 or more was used, good curability and weak odor were also achieved at the same time with or without a coloring material.

As seen in Examples 3 and 8, it was found that good curability was demonstrated due to the usage of an initiator containing a nitrogen atom and having a molecular weight of 500 or more when containing a coloring material.

As seen in Example 9, in which a large amount of monomers having a hydroxyl group were contained, when a general-purpose slide glass having a clean surface was used as a substrate and a commercially available cellophane tape was attached to a coated film on the substrate and violently peeled-off therefrom, the coated film still adhered to the slide glass of the substrate. That is, good attachability to the glass substrate was found to be achieved at the same time in addition to curability and light odor.

Of Examples in which no coloring material was contained, the cured coated film in Example 1 was colored pale yellow. Therefore, this is thought to be suitable for applications in which pale yellow is required or the color tone does not have a significant meaning. In Examples 2, 4 to 7, and 9, since the coated film was not significantly colored.

These are thought to be suitable for applications in which the color tone of the substrate and the basic color has a significant meaning.

Since the initiator has absorption between 365 and 395 nm, absorption also occurs in this region as the ink. It is possible to use a generally-used visible light ultraviolet spectrophotometer to measure the spectrum.

Discharging Reliability

Discharging reliability was evaluated for a combination of the ink of Example 2 and the liquid discharging device including a discharging head not having a flow channel circulating in the individual liquid chamber and a combination of the ink of Example 2 and the flow-through type liquid discharging device in which the flow channel circulates in the individual liquid chamber.

After filling with the ink and leaving the ink at 40 degrees C. and 95 percent RH for 12 hours, the ink was adjusted to have a viscosity of from 6 to 11 mPa-s by temperature adjustment. Using each of the liquid discharging device including a discharging head not having a flow channel circulating in the individual liquid chamber and the flow-through type liquid discharging device circulating in the individual liquid chamber, droplets of 3 to 15 pl of the ink were discharged to a commercially available polyethylene terephthalate film (COSMOSHINE, thickness of 188 μm, manufactured by TOYOBO CO., LTD.) to print a nozzle check pattern. The number of the discharging nozzles that normally discharged the initial droplet to the total number of 384 was calculated to obtain the normal discharging ratio.

While the normal discharging ratio was 30 percent for the liquid discharging device including a discharging head not having a flow channel circulating in the individual liquid chamber, the normal discharging ratio was 95 percent for the flow-through type liquid discharging device circulating in the individual liquid chamber.

In addition, the ink of Example 2 was adjusted by the temperature control to have a viscosity of 6 to 11 mPa-s and droplets of the ink of from 3 to 15 pl were discharged by two liquid discharging devices including a discharging head having a flow channel circulating in the individual liquid chamber. One had 2656 nozzles and the other had 1920 nozzles. The normal discharging ratio was obtained from the number of nozzles that normally discharged the initial ink droplet in the total number of nozzles in the same manner as in the evaluation on the discharging reliability.

The normal discharging ratio was 90 percent for both the head including the 2656 nozzles and the head including the 1920 nozzles.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority pursuant to 35 U.S.C. § 119 to Japanese Patent Application Nos. 2018-002114 and 2018-182284, filed on Jan. 10, 2018 and Sep. 27, 2018, respectively, in the Japan Patent Office, the entire disclosures of which are hereby incorporated by reference herein. Having now fully described embodiments of the present invention, it will be apparent to one of ordinary skill in the art that many changes and modifications can be made thereto without departing from the spirit and scope of embodiments of the invention as set forth herein.

REFERENCE SIGNS LIST

FIGS. 1 to 6 and FIGS. 8 and 9
1. Nozzle plate
2. Flow channel plate
3. Diaphragm member
4. Nozzle
6. Individual liquid chamber
6a, 6b, 6c, 6d, and 6e: Through-hole groove portions constituting individual liquid chambers
7. Fluid resistance
7a. Through-hole groove portion constituting fluid resistance
8. Liquid introducing portion
8a and 8b: Through-hole groove portion constituting liquid introducing portion
9. Filter portion
10. Common liquid chamber
10A. Common liquid chamber on downstream side
10a. Through-hole groove portion
10B. Common liquid chamber on upstream side
10b. Groove portion
11. Piezoelectric actuator
12. Piezoelectric member
12A and 12B. Piezoelectric element
13. Base member
15. Flexible wiring members
20. Common liquid chamber member
21. First common liquid chamber member
22. Second common liquid chamber member
25a and 25b. Through-holes for piezoelectric actuator
29. Cover
30. Vibration area
30a and 30b. Convex portions
40. Flow channel member
41 to 45. Plate members
50. Circulating common liquid chamber
50a. Groove portion
51. Fluid resistance
51a. Through-hole groove portion constituting fluid resistance
52 and 53. Circulation flow channel
52a and 52b. Through-hole groove portions constituting circulation flow path
53a, 53b, 53c, and 53d. Through-hole groove portions constituting circulation flow path
71. Supply port
71a. Through-hole
81. Circulation port
81a and 81b. Through-holes
FIGS. 10 to 12
401. Guiding member
403. Carriage
404. Liquid discharging head
405. Main scanning motor
406. Drive pulley
407. Driven pulley
408. Timing belt
410. Paper
412. Conveyor belt
413. Conveyor roller
414. Tension roller
416. Sub-scanning motor
417. Timing belt
418. Timing pulley
420. Maintenance recovery assembly
421. Capping member
422. Wiping member (wiper)
440. Liquid discharging unit
491A and 491B. Side plate
491C. Back plate
493. Main scanning moving assembly
494. Supply and circulation assembly
495. Conveyance assembly
FIGS. 13 to 15
210. Print substrate supplying roll
220. Print substrate
23. Printing unit
23a. Printing unit for each color
23b. Printing unit for each color
23c. Printing unit for each color
23d. Printing unit for each color
24a. Ultraviolet ray light source
24b. Ultraviolet ray light source
24c. Ultraviolet ray light source
24d. Ultraviolet ray light source
25. Processing unit
26. Print reeling roll
200. Ink cartridge
241. Ink bag
242. Ink inlet
243. Ink discharging outlet
244. Cartridge housing

The invention claimed is:

1. A curable liquid composition, comprising:
a monomer having an SI value of less than 3.0; and
a photopolymerization initiator having a weight average molecular weight of 500 to 2,000,
wherein the monomer having an SI value of less than 3.0 is a (meth)acrylic acid ester compound,
wherein the photopolymerization initiator is a liquid polymer and includes a chemical structure including at least one of a phenyl glyoxylate skeleton and a benzophenone skeleton,
wherein the curable liquid composition is negative in skin sensitization, and
wherein negative in skin sensitization refers to a composition comprising a skin sensitizing substance in an amount of less than 0.1 percent as defined according to the Globally Harmonized System.

2. The curable liquid composition according to claim 1, wherein the photopolymerization initiator includes a chemical structure including the benzophenone skeleton.

3. The curable liquid composition according to claim 1, wherein the photopolymerization initiator has a chemical structure containing a nitrogen atom.

4. The curable liquid composition according to claim 1, wherein the monomer includes a hydroxyl group-containing monomer.

5. A composition-accommodating container, comprising: the curable liquid composition of claim 1.

6. A liquid composition discharging device, comprising: the composition-accommodating container of claim 5.

7. A liquid composition discharging device, comprising:
a discharging head configured to discharge the curable liquid composition of claim 1, the discharging head comprising multiple nozzles to discharge liquid, individual liquid chambers communicating with the nozzles, a common liquid chamber to supply the liquid to the individual liquid chambers, a circulating common liquid chamber communicating with a circulation flow channel communicating with the individual liquid chambers, and a pressure generating device to apply a pressure to the liquid in the individual liquid chambers.

8. A cured material of the curable liquid composition of claim 1.

9. A method of manufacturing a curable material, comprising:
discharging the curable liquid composition of claim 1; and
irradiating the curable liquid composition with light to cure.

10. A method of manufacturing a cured material, comprising:
discharging the curable liquid composition of claim 1 with a liquid composition discharging device including a discharging head including multiple nozzles to discharge liquid, individual liquid chambers communicating with the nozzles, a common liquid chamber to supply the liquid to the individual liquid chambers, a common circulation liquid chamber communicating with a circulating flow channel communicating with the individual liquid chambers, and a pressure generating device to apply a pressure to the liquid in the individual liquid chambers; and
irradiating the curable liquid composition with light to cure.

11. The curable liquid composition according to claim 1, wherein an amount of photopolymerization initiator is 30 parts by mass or less based on 100 parts by mass of the total amount of the monomer component.

12. The curable liquid composition according to claim 1, wherein an amount of the monomer having an SI value of less than 3 is 50 to 95 parts by mass based on 100 parts by mass of the total amount of the liquid composition.

13. An ink, comprising:
the curable liquid composition according to claim 1,
wherein the ink viscosity is 8 to 15 mPa-s at a discharging temperature of from 30 to 60 degrees C.

14. The curable liquid composition according to claim 1, wherein at least two different monomers having an SI value of less than 3.0 are used.

15. The curable liquid composition according to claim 1, wherein the monomer having an SI value of less than 3.0 is a methacrylic acid ester compound.

16. The curable liquid composition according to claim 1, wherein the monomer having an SI value of less than 3.0 is an acrylic acid ester compound.

17. The curable liquid composition according to claim 1, wherein the photopolymerization initiator includes a chemical structure including the phenyl glyoxylate skeleton.

18. The curable liquid composition according to claim 1, wherein the photopolymerization initiator includes a chemical structure including the phenyl glyoxylate skeleton and the benzophenone skeleton.

* * * * *